United States Patent [19]
Usui et al.

[11] 4,194,608
[45] Mar. 25, 1980

[54] CONTROLS FOR CLUTCH, MOTOR AND TRANSMISSION

[75] Inventors: Keizaburo Usui; Isao Hayama, both of Yokohama; Hideo Hamada, Yokosuka; Sigeaki Yamamuro, Yokohama, all of Japan

[73] Assignee: Nissan Motor Company, Limited, Yokohama, Japan

[21] Appl. No.: 788,549

[22] Filed: Apr. 18, 1977

[30] Foreign Application Priority Data

Apr. 19, 1976 [JP] Japan ............................... 51-44866

[51] Int. Cl.² .................... B60K 21/00; B60K 29/00
[52] U.S. Cl. ............................ 192/0.092; 192/0.075; 192/0.084; 192/3.58; 192/0.052
[58] Field of Search .............. 192/0.084, 0.092, 3.58, 192/3.59, 0.052, 0.075, 0.076

[56] References Cited
U.S. PATENT DOCUMENTS

| | | | |
|---|---|---|---|
| 2,086,576 | 7/1937 | Price et al. | 192/0.075 |
| 2,605,874 | 8/1952 | Price | 192/0.092 |
| 3,548,980 | 12/1970 | Schmidt | 192/4 A X |
| 3,628,642 | 12/1971 | Ravenel | 192/4 A X |
| 3,667,577 | 6/1972 | Weymann | 192/0.084 |
| 3,756,358 | 9/1973 | Epenschied | 192/4 A |
| 3,834,499 | 9/1974 | Candellero et al. | 192/4 A |
| 4,061,217 | 12/1977 | Toyota et al. | 192/0.052 |

Primary Examiner—Benjamin Wyche
Attorney, Agent, or Firm—Schwartz, Jeffery, Schwaab, Mack, Blumenthal & Koch

[57] ABSTRACT

A countershaft-type automatic power transmission in which a countershaft gear assembly is operated by a hydraulic control system controlled by electric control means responsive to various operational variables of a vehicle and in which a clutch assembly is operated between the coupled and uncoupled conditions by clutch control valve means which is also controlled by the electric control means, the power transmission further featuring throttle valve control means adapted to move the carburetor throttle valve to a position to produce an idling condition in the engine independently of the accelerator pedal when the clutch assembly is in the uncoupled condition.

3 Claims, 13 Drawing Figures

CONTROLS FOR CLUTCH, MOTOR AND TRANSMISSION

FIELD OF THE INVENTION

The present invention relates to countershaft power transmissions of automotive vehicles and particularly to a countershaft power transmission which is fully automated by the use of a hydraulic control system which is electrically operated in accordance with various operational variables of a vehicle.

DESCRIPTION OF THE PRIOR ART

Automatic power transmissions which are presently in wide use for automotive vehicles generally utilize torque converters and two, three or four forward-speed transmission mechanisms using planetary or epicyclic gear trains. Torque converters are, however, inherently subject to slippage between the driving and driven members when the torque converters are in coupled conditions. This results in deterioration of the torque transmission efficiency and accordingly in the engine fuel economy. Furthermore, the planetary gear trains and the associated clutches and brakes are not only intricate in construction and are accordingly expensive but have limited freedom in selecting gear ratios so that the drivers' feelings are inferior to those available in manually-operated standard power transmission especially during deceleration and acceleration conditions of the vehicles. A prime object of The present invention is to provide a useful solution to these problems by provision of a countershaft power transmission having a hydraulic control system which is automatically controlled in accordance with various operating conditions of an automotive vehicle.

SUMMARY OF THE INVENTION

In accordance with the present invention, such an object will be accomplished in an automatic countershaft power transmission for an automotive vehicle including an internal combustion engine including a mixture supply system having a throttle valve to be operated by an accelerator pedal, comprising, in combination, a countershaft transmission gear assembly including a transmission input shaft, a transmission mainshaft substantially in line with the transmission input shaft, a countershaft substantially parallel with the transmission mainshaft and a plurality of gears on the transmission input shaft, mainshaft and countershaft and arranged to be capable of producing a neutral gear, a plurality of forward-drive gears and at least one reverse-drive gear; a clutch assembly disposed between the output shaft of the engine and the input shaft of the transmission gear assembly and having a coupled condition providing driving connection from the output shaft of the engine to the input shaft of the transmission gear assembly and an uncoupled condition disconnecting the input shaft of the transmission gear assembly from the output shaft of the engine; electrically-operated clutch control valve means operative to actuate the clutch assembly selectively into the uncoupled condition or into the coupled condition at stepwise variable rates; electrically-operated throttle-valve control means operative to control the throttle valve in the mixture supply system independently of the accelerator pedal when the clutch assembly is in the uncoupled condition; mechanical linkage means engageable with predetermined ones of the gears in the transmission gear assembly for selectively producing one of the neutral, forward-drive and reverse-drive gears; an electrically-operated hydraulic control system which is drivingly connected to the mechanical linkage means for operating the linkage means to selectively produce one of the neutral, forward-drive and reverse-drive gears in the transmission gear assembly; and an electric control circuit responsive to predetermined operational variables of the vehicle for producing electrical signals to control the clutch control valve means, throttle-valve control means and hydraulic control system depending upon the aforesaid operational variables. The control circuit is preferably so arranged as to be responsive to the uncoupled condition of the clutch assembly for actuating the throttle-valve control means to move the throttle valve in the mixture supply system toward the fully closed position thereof independently of the accelerator pedal when the clutch assembly is in the uncoupled condition. The above-mentioned forward-drive gears may include at least three forward-drive gears, in which instance the hydraulic control system for the transmission gear assembly comprises fluid-operated first and second control cylinders each having a piston which is operatively connected to the aforesaid mechanical linkage means and which is movable between three different positions allocated to predetermined ones of the neutral, forward-drive and reverse-drive gears.

DESCRIPTION OF THE DRAWINGS

The features and advantages of a countershaft-type automatic power transmission according to the present invention will be more clearly understood from the following description taken in conjunction with the accompanying drawings, in which.

DESCRIPTION OF THE PREFERRED EMBODIMENT

Figure 1:
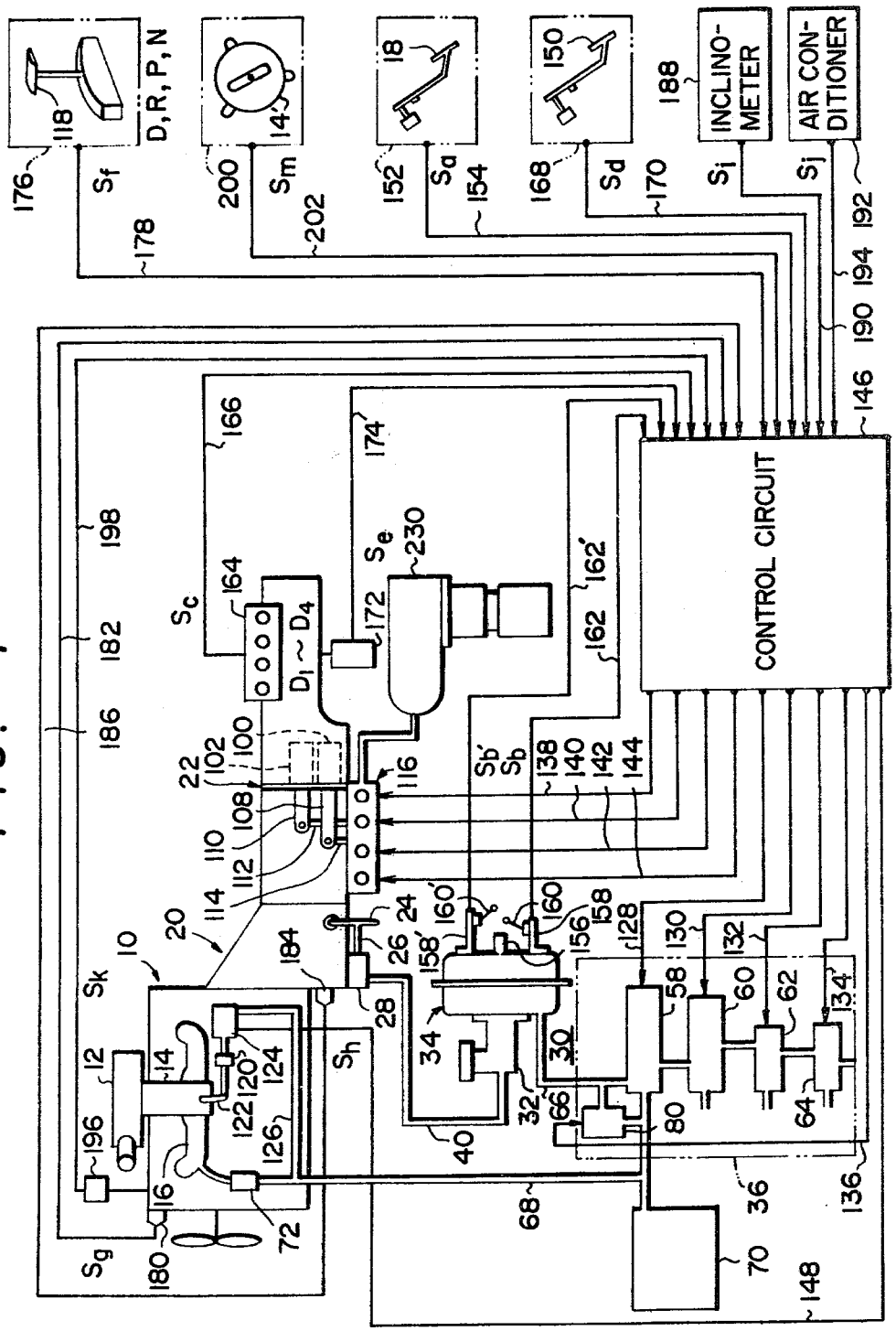
FIG. 1 is a schematic diagram showing overall construction and arrangement of a preferred embodiment of an automatic countershaft power transmission according to the present invention.

A preferred embodiment of a countershaft-type automatic power transmission according to the present invention will be hereinafter described with reference to the drawings. Referring first to FIG. 1, a countershaft-type automatic power tramsmission embodying the present invention is used in combination with an automotive internal combustion engine 10 comprising an air-fuel mixture supply system of the carburetor type. The mixture supply system is thus shown including an air cleaner 12 as air intake means, a carburetor 14 downstream of the air cleaner 12 and an intake manifold 16 through which the carburetor 14 is in communication with the combustion chambers (not shown) of the engine 10. If the engine 10 is of the fuel injection type, the engine comprises an air meter pipe (not shown) in lieu of the carburetor 14. The carburetor 14 or the air meter pipe has mounted therein a throttle valve (not shown) which is connected to an accelerator pedal 18 through a suitable mechanical linkage (not shown) so that the flow of the air-fuel mixture to be delivered from the carburetor 12 or the flow of air through the air meter tube in the fuel injection mixture supply system is controlled as the accelerator pedal 18 is depressed or released, as is well known.

The power transmission comprises a mechanical clutch assembly 20 and a countershaft type transmission gear assembly 22. Though not shown, the clutch assembly 20 has a driving member which is constituted by a flywheel connected to the output shaft of the engine 10 and a driven member constituted by at least one friction disc which is connected to the input shaft of the transmission gear assembly 22. The friction disc is biased to engage the flywheel by means of a spring-loaded pressure plate (not shown) to which a clutch drive lever 24 is pivotally connected at one end thereof. The clutch drive lever 24 is pivotally connected at the other end thereof to the plunger 26 of a fluid-operated clutch drive cylinder 28 which forms part of an electrically-operated clutch control system 30. The clutch assembly 20 is thus biased to stay in a coupled condition providing driving connection from the output shaft of the engine 10 to the input shaft of the transmission gear assembly 22, while the clutch drive cylinder 28 is arranged in such a manner as to drive the clutch drive lever 24 to move in a direction to produce an uncoupled condition in the clutch assembly 20 when a fluid pressure is built up in the cylinder 28. A clutch assembly of this nature being well known in the art and the construction and arrangement of a fluid-operated clutch drive cylinder to achieve the above described function being a mere matter of design choice, no further description will be herein made regarding the detailed constructions and operation of the clutch assembly 20 and the clutch drive cylinder 28.

Figure 2:
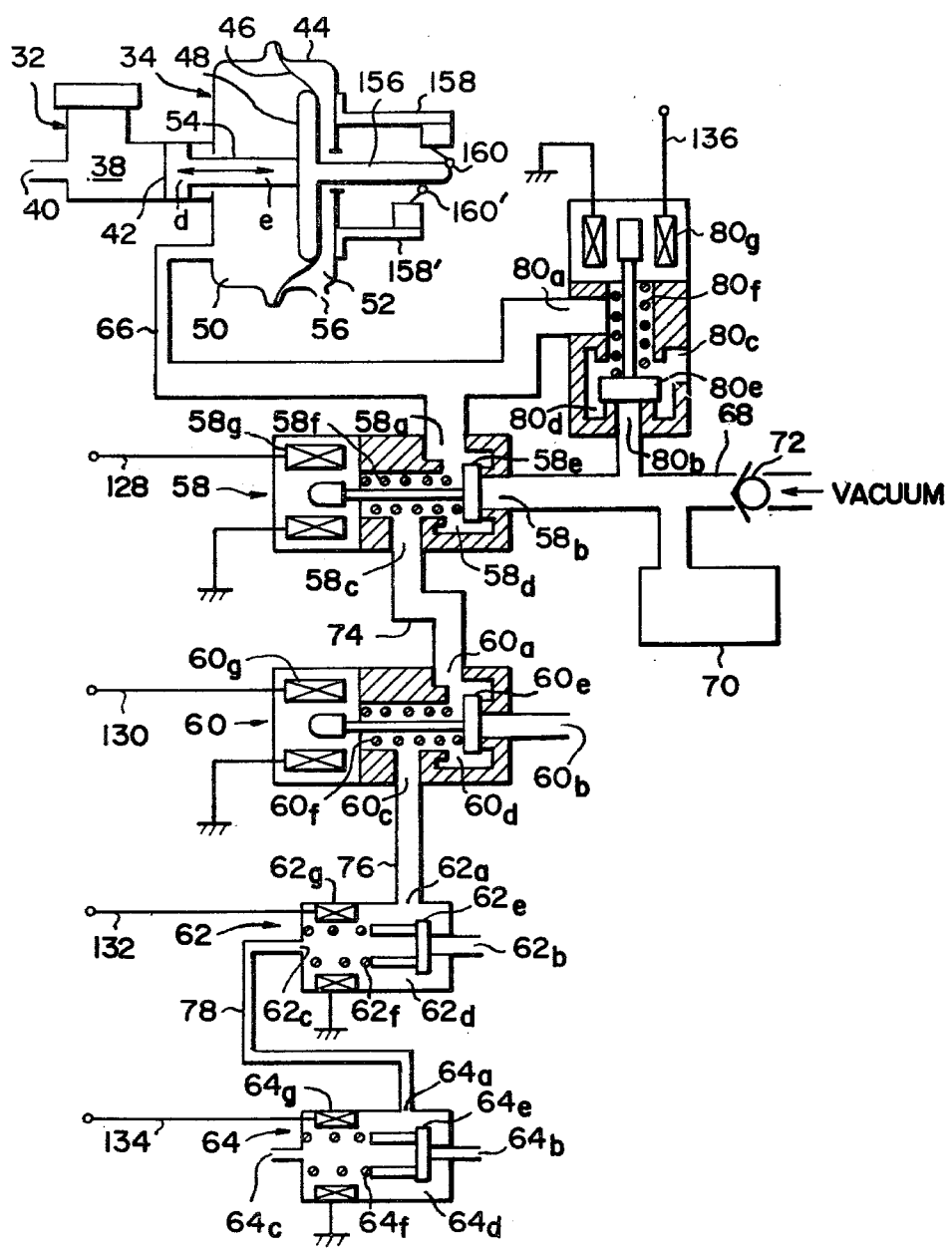
FIG. 2 is a schematic sectional view showing details of the clutch control valve arrangement incorporated in the embodiment illustrated in FIG. 1.

The electrically-operated clutch control system 30 largely comprises, in addition to the above described clutch drive cylinder 28, a master cylinder 32, a vacuum-operated servo unit 34 and a vacuum control valve arrangement 36 which is only diagrammatically illustrated in FIG. 1. The master cylinder 32 has a cylinder chamber 38 (FIG. 2) which is in constant communication with the clutch drive cylinder 28 through a passageway 40. As seen in FIG. 2, the master cylinder 32 further has a piston 42 which is axially movable back and forth in the cylinder chamber 38. As is also shown in FIG. 2, the vacuum-operated servo unit 34 comprises a hollow casing 44 which is fixedly connected to the master cylinder 32. Within the casing 44 is mounted an annular diaphragm element 46 which is securely connected along its outer circumferential end to the casing 44 and along its inner circumferential end to a piston 48, dividing the internal space of the casing 44 into two complementarily contractable and expansible variable-volume chambers 50 and 52 which will be hereinafter referred to as control and atmospheric chambers, respectively. The piston 48 is connected to the piston 42 of the master cylinder 32 by a connecting rod 54 which extends throughout the control chamber 50 of the servo unit 34 into the cylinder chamber 38 of the master cylinder 32. The casing 44 is further formed with a breather port 56 through which the atmospheric chamber 52 is constantly open to the atmosphere.

The piston 42 of the master cylinder 32 and the piston 48 of the servo unit 34 are axially movable as a single unit relative to the casing 44 of the servo unit 34 in directions which are indicated by arrows e and d, viz., rightwardly and leftwardly in FIG. 2. When the piston 48 of the servo unit 34 is moved in the direction of arrow e, viz., in a direction to produce expansion of the control chamber 50, then the piston 42 of the master cylinder 32 is also moved in the direction of arrow e so that the fluid pressure in the master cylinder 32 and accordingly in the clutch drive cylinder 28 (FIG. 1) is reduced and allows the clutch assembly 20 to be in a coupled condition. When the piston 48 of the servo unit 34 and accordingly the piston 42 of the master cylinder 32 are moved in the reverse direction indicated by arrow d, viz., in a direction to produce contraction of the control chamber 50, the fluid pressure in the master cylinder 32 and accordingly in the clutch drive cylinder 28 increases and moves the clutch drive lever 24 in a direction to cause the clutch assembly 20 to be uncoupled. The piston 48 of the servo unit 34 is biased to move in the direction of arrow e, viz., in the direction to hold the clutch assembly 28 in a coupled condition by the fluid pressure acting on the piston 42 of the master cylinder 32. The movement of the piston 48 of the servo unit 34 in the direction of arrow d, viz., in the direction to uncouple the clutch assembly 28 is caused by the vacuum which is developed in the control 50 under the control chamber of the previously mentioned vacuum control valve arrangement 36.

As illustrated in detail in FIG. 2, the vacuum control valve arrangement 36 comprises solenoid-operated first, second, third and fourth valve units 58, 60, 62 and 64 which are constructed essentially similarly to one another. Each of the valve units 58, 60, 62 and 64 comprises first, second and third ports which are indicated by subscripts a, b and c, respectively, which are affixed to each of the reference numerals 58, 60, 62 and 64 and a valve chamber d affixed to each of the numerals 58, 60, 62 and 64. The first port 58a of the first valve unit 58 is in constant communication with the control chamber 50 of the servo unit 34 through a passageway 66 while the second port 58b of the valve unit 58 is in communication with a suitable source of vacuum such as the intake manifold 16 of the engine 10 as indicated in FIG. 1 through a passage 68 which is provided with a vacuum reservoir 70 and a one-way check valve 72 located upstream of the vacuum reservoir 70. The third port 58c of the first valve unit 58 is in constant communication with the first port 60a of the second valve unit 60 through a passageway 74. The respective second ports 60b and 62b of the second and third valve units 60 and 62 are open to the atmosphere and the respective third ports 60c and 62c of the second and third valve units 60 and 62 are in constant communication with the respective first ports 62a and 64a of the third and fourth valve units 62 and 64 through passageways 76 and 78, respectively. The second and third ports 64b and 64c of the fourth valve unit 64 are open to the atmosphere. Each of the valve units 58, 60, 62 and 64 further comprises a valve element which is indicated by e affixed to each of the reference numerals 58, 60, 62 and 64 and a suitable biasing element such as a preloaded helical compression spring which is indicated by f affixed to each of the reference numerals 58, 60, 62 and 64. Each of the valve elements 58e, 60e, 62e and 64e of the valve units 58, 60, 62 and 64 is axially movable in the valve chamber of the unit between a first axial position providing communication between the first and third ports through the valve chamber and closing the second port in each valve unit as shown in FIG. 2 and a second axial position blocking the communication between the first and third ports and providing communication between the first and second ports through the valve chamber in each valve unit, the individual valve elements 58e, 60e, 62e and 64e being biased to move toward the respective first axial positions thereof by the associated compression springs 58f, 60f, 62f and 64f. Each of the valve units 58, 60, 62 and 64 further comprises a solenoid plunger integral with the valve element of the valve unit and an exciting coil which is integral the solenoid plunger as indicated by g affixed to each of the reference numerals 58, 60, 62 and 64. The plunger and exciting coil of each of the valve units 58, 60, 62 and 64 are arranged in such a manner that the valve element connected to the plunger is moved to the second axial position thereof against the force of the associated compression spring when the exciting coil is energized. When, thus, the exciting coils 58g, 60g, 62g and 64g of the first, second, third and fourth valve units 58, 60, 62 and 64 remain de-energized and accordingly the valve elements 58e, 60e, 62e and 64e of all the valve units 58, 60, 62 and 64 are held in the first axial positions thereof closing the respective second ports 58b, 60b, 62b and 64b of the valve units, communication is established between the first and third ports of each of the valve units 58, 60, 62 and 64 through the valve chamber between the ports as illustrated in FIG. 2 against the force of the compression spring of the valve unit. The first port 58a of the first valve unit 58 is therefore in communication with the third port 64c of the fourth valve unit 64 through the respective valve chambers 58d, 60d, 62d and 64d and the passageways 74, 76 and 78 and is open to the atmosphere through the third port 64c of the fourth valve unit 64. Under these conditions, atmospheric air admitted through the third port 64c into the valve chamber 64d of the fourth valve unit 64 is directed by way of the valve units 58, 60, 62 and 64 and the passageway 66 into the control chamber 50 of the servo unit 34 and allows the piston 48 to be extreme position in the direction of arrow e and, as a consequence, produces a coupled condition in the clutch assembly 20 shown in FIG. 1. If the exciting coil 64g of the fourth valve unit 64 is then excited, the valve element 64e of the particular valve unit is moved against the force of the associated compression spring 62f to the second axial position thereof closing the third port 64c and providing communication between the first and second ports 64a and 64b through the valve chamber 64d. The first port 58a of the first valve unit 58 and accordingly the control chamber 50 of the servo unit 34 are now in communication with the second port 64b of the fourth valve unit 64 and are open to the atmosphere through the second port 64b of the fourth valve unit 64. If the respective exciting coils 58g and 60g of the first and second valve units 58 and 60 remain de-energized and the exciting coil 62f of the third valve unit 62 is energized, the first port 58a of the first valve unit 58 is open to the atmosphere through the second port 62b of the third valve unit 62 in which the valve element 62e is moved against the force of the associated compression spring 62g into the second axial position thereof blocking the communication between the first and third ports 62a and 62c and establishing communication between the first and second ports 62a and 62b through the valve chamber 62d irrespective of whether the exciting coil 64g of the fourth valve unit 64 is energized or de-energized. Under these conditions, atmospheric air admitted through the second port 62b into the valve chamber 62d of the third valve unit 62 is directed to the first port 58a of the first valve unit 58 and past the port 58a to the control chamber 50 of the servo unit 34. If the exciting coil 60g of the second valve unit 60 is then energized with the exciting coil 58g of the first valve unit 58 kept de-energized, the valve element 60e of the second valve unit 60 is moved against the force of the associated compression spring 60f into the second axial position thereof blocking the communication between the first and third ports 60a and 60c and establishing communication between the first and second ports 60a and 60b through the valve chamber 60d of the valve unit 60 irrespective of whether the exciting coil of each of the third and fourth valve units 62 and 64 is energized or de-energized. The first port 58a of the first valve unit 58 and accordingly the control chamber 50 of the servo unit 34 are now in communication with the second port 60b of the second valve unit 60 and are open to the atmosphere through the port 60b. If, furthermore, the exciting coil 58g of the first valve unit 58 is energized, the valve element 58e of the valve unit 58 is moved against the force of the associated compression spring 58f into the second axial position thereof blocking the communication between the first and third ports 58a and 58c and establishing communication between the first and second ports 58a and 58b through the valve chamber 58d irrespective of whether the exciting coil of each of the second, third and fourth valve units 60, 62 and 64 is energized or de-energized. Under these conditions, the vacuum passageway 68 is allowed to be in communication with the first port 58a of the valve unit 58 and past the port 58a and through the passageway 66 with the control chamber 50 of the servo unit 34 so that vacuum is developed in the control chamber 50 of the servo unit 34 and forces the piston 48 to move in the direction of arrow d, producing an uncoupled condition in the clutch assembly 20 (FIG. 1).

The respective second ports 60b, 62b and 64b of the second, third and fourth valve units 60, 62 and 64 are so sized as to have sectional areas which are larger in this sequence. The flow rate of air through the second port 62b of the third valve unit 62 is thus lower than the flow rate of air through the second port 60b of the second valve unit 60 and higher than the flow rate of air through the second port 64b of the fourth valve unit 64. Furthermore, the third port 64c of the fourth valve unit 64 is sized so that the flow rate of air therethrough is lower than the flow rate of air through the second port 62b of the third valve unit 62 and higher than the second port 64b of the fourth valve unit 64. The flow rates of air through the second and third ports 64b and 64c of the fourth valve 64 and the respective second ports 62b and 60b of the third and second valve units 62 and 60 are therefore higher in this sequence. On the other hand, the first and third ports 58a and 58c of the first valve unit 58, the first port 60a of the second valve unit 60 and the passageways 66 and 74 are sized to have sectional areas which are substantially equal to or slightly larger than the sectional area of the second port 60b of the second valve unit 60. When the exciting coil 58g of the first valve unit 58 is de-energized so that communication is established between the first and third ports 58a and 58c of the valve unit 58 and at the same time any one or ones of the exciting coils 60g, 62g and 64g of the second, third and fourth valve units 60, 62 and 64 is or are energized so that the third port 58c of the first valve unit 58 is open to the atomosphere through any one of the second ports 60b and 62b of the respective second and third valve units 60 and 62 and the second and third ports 64b and 64c of the fourth valve unit 64, then the piston 48 of the servo unit 34 and accordingly the piston 42 of the master cylinder 32 are moved in the direction of the arrow e at a velocity which is substantially porportional to the flow rate of air through the port 60b, 62b, 64b or 64c through which atmospheric air is passed over to the control chamber 50 of the servo unit 34 by way of the first and third ports 58a and 58c of the first valve unit 58. If the clutch assembly 20 has been held in the fully uncoupled condition before these take place, the clutch assembly 20 is driven toward the fully coupled condition at a rate which is substantially proportional to the flow rate of air through the port 60b, 62b, 64b or 64c through which atmospheric air is directed to the control chamber 50 of the servo unit 34. If, therefore, the exciting coils 60g, 62g and 64g of the second, third and fourth valve units 60, 62 and 64 are selectively energized with the exciting coil 58g of the first valve unit 58 kept deenergized, the clutch assembly 20 is driven toward the fully coupled condition at stepwise varied rates. When the exciting coil 58g of the first valve unit 58 is thereafter energized, the communication between the first and third ports 58a and 58c of the valve unit 58 is interrupted and as a consequence the control chamber 50 of the servo unit 34 is isolated from the open air. Under these conditions, communication is provided between the first and second ports 58a and 58b of the first valve unit 58 so that the vacuum developed in the intake manifold 14 of the engine (FIG. 1) is extended to the control chamber 50 of the servo unit 34 through the vacuum passageway 68, the first valve unit 58 and the passageway 66. The piston 48 of the servo unit 34 and accordingly the piston 42 of the master cylinder 32 are driven to move in the direction of the arrow d at a substantially fixed velocity with the result that the clutch assembly 20 is driven toward the fully uncoupled condition thereof at a substantially fixed rate.

For the purpose of modulating the rate at which the clutch assembly 20 is thus actuated toward the fully uncoupled condition, the vacuum control valve arrangement 36 may further comprise a solenoid-operated timing control valve unit 80 which comprises first, second and third ports 80a, 80b and 80c and a valve chamber 80d as shown in FIG. 2. The first port 80a is in constant communication with the passageway 66 between the control chamber 50 of the servo unit 34 and the first port 58a of the first valve unit 58 while the second port 80b is in constant communication with the vacuum passageway 68 downstream of the one-way check valve 72. The third port 80c is open to the atmosphere. A valve element 80e is axially movable between a position closing the second port 80b and providing communication between the first and third ports 80a and 80c through the valve chamber 80d as shown and a position closing the first port 80a and providing communication between the second and third ports 80b and 80c through the valve chamber 80d. The valve element 80e is urged to move toward the position closing the second port 80b by suitable biasing means such as a preloaded helical compression spring 80f. When the valve element 80e is held in the position thus closing the second port 80b by the force of the compression spring 80f, the first port 80a is open to the atmosphere through the valve chamber 80d and the third port 80c so that the passageway 66 between the servo unit 34 and the first valve unit 58 is in communication with the open air past the third port 58c of the valve unit 58 through the valve unit 80. The ports 80a, 80b and 80c and the valve chamber 80d of the control valve unit 80 are sized so that an orifice is formed between the first and third ports 80a and 80c or the second and third ports 80b and 80c depending upon the axial position of the valve element 80e in the valve chamber 80d. The flow rate of air through the third port 80c is thus lower than an extremely small predetermined value. When the control valve unit 80 is in a condition providing communication between the first and third ports 80a and 80c as shown by the force of the compression spring 80f and at the same time the first to fourth valve units 58, 60, 62 and 64 are in conditions in which the first port 58a of the first valve unit 58 is open to the atmosphere through any one of the second, third and fourth valve units 60, 62 and 64, atmospheric air is admitted into the passageway 66 and accordingly into the control chamber 50 of the servo unit 34 not only through the first valve unit 58 but at a limited rate through the control valve unit 80. If, however, the first valve unit 58 is in a condition providing communication between the first and second ports 58a and 58b thereof and accordingly between the passageways 66 and 68 through the ports 58a and 58b with the control valve unit 80 held in the condition providing communication between the first and third ports 80a and 80c thereof, atmospheric air is drawn at a limited rate into the passageway 66 and the control chamber 50 of the servo unit 34 through the control valve unit 80 while the vacuum in the vacuum passageway 68 is being extended into the control chamber 50 of the servo unit 34 through the first valve unit 58 and the passageway 66, thereby causing slowdown of the movement of the piston 48 of the servo unit 34 in the direction of the arrow d to produce an uncoupled condition in the clutch assembly 20. The valve element 80e of the control valve unit 80 is connected to a solenoid plunger surrounded by an exciting coil 80g so that the valve element 80e is moved against the force of the compression spring 80f to the position closing the first port 80a and providing communication between the second and third ports 80b and 80c when the exciting coil 80g is energized. If, under these conditions, the first valve unit 58 is held in the condition providing communication between the first and second ports 58a and 58b, the first port 80a of the control valve unit 80 is isolated from the open air but, instead, the vacuum passageway 68 is open to the atmosphere through the second and third ports 80b and 80c of the control valve unit 80 so that atmospheric air is drawn at a limited rate into the vacuum passageway 68 and through the first valve unit 58 and the passageway 66 into the control chamber 50 of the servo unit 34 and thus also modulates the rate at which the clutch assembly 20 is driven toward the uncoupled condition thereof.

Turning back to FIG. 1 of the drawings, the countershaft transmission gear assembly 22 of the automatic power transmission embodying the present invention is assumed by way of example to be of the four-forward-speed and one-reverse speed design. As seen in FIGS. 3A, 3B, 3C and 3D, the transmission gear assembly 22 comprises transmission manishaft 82 which is in line with the transmission input shaft (not shown) connected to the clutch disc of the clutch assembly 20 and a transmission countershaft 84 which is parallel with the transmission mainshaft 82. Though not shown, the transmission mainshaft 82 has mounted thereon gears and synchronizing rings axially movable on the mainshaft while the transmission countershaft 84 has mounted thereon gears which are fixed on the countershaft and which includes a main driven gear which is constantly in mesh with the main drive gear on the transmission input shaft. The transmission mainshaft 82 has further mounted thereon gear-position selector clutch collars 86 and 88 (FIG. 3B and 3D) which are movable with the gears and synchronizer rings along the mainshaft so that the first, second, third and fourth (or direct drive) forward speed gears and the reverse, parking and neutral gears are selectively established by moving the clutch collars 86 and 88 along the transmission manishaft 82, as is well known in the art of manually-operated standard power transmissions for automotive vehicles. The clutch collars 86 and 88 form part of a gear-position selector mechanism which further comprises three gearshift guide bars 90, 92 and 94 which are fixedly connected to the transmission casing accommodating the gear clusters therewithin and which are substantially parallel with the transmission mainshaft 82 and countershaft 84. The clutch collars 86 and 88 are engaged by shifter forks 96 and 98, respectively, which are splined to two (90 and 92) of these guide bars 90, 92 and 94 and which are moved along the bars 90 and 92 by means of a gear-position selector linkage 100 and a gearshift control linkage 102, respectively. The gear-position selector linkage 100 and the gearshift control linkage 102 are rotatably mounted on shafts 104 and 106, respectively, which have center axes non-intersecting and perpendicular to the transmission mainshaft 82 and countershaft 84. As will be understood more clearly as the description proceeds, the gear-position selector linkage 100 is rotatable about the center axis of the shaft 104 between a first angular position to produce the first or second forward-speed gear, a second angular position to produce the third or fourth forward-speed gear and a third angular position to produce the reverse gear while the gearshift control linkage 102 is rotatable about the center axis of the shaft 106 between a first angular position to produce the first or third forward-speed gear, a second angular position to produce the neutral condition in the transmission gear assembly and a third angular position to produce the second or fourth forward-speed gear or the reverse gear. As are diagrammatically illustrated in FIG. 1, the gear-position selector linkage 100 includes a gear-position selective lever 108 and likewise the gearshift control linkage 102 includes a gearshift control lever 110. To these levers 108 and 110 are pivotally connected actuating rods 112 and 114, respectively, which are adapted to be driven by means of a solenoid-operated hydraulic control system 116 which is also diagrammatically illustrated in FIG. 1. The construction of the hydraulic control system 116 will be described later.

The gear position selector and gearshifrt control linkages 100 and 102 are operatively connected to a manually-operated gearshift lever 118 (FIG. 1) and can be manually moved into the position to produce the automatic forward-drive range D or any of the reverse-drive, parking and neutral positions R, P and N by manipulation of the lever 118 as in a usual automatic power transmission.

The internal combustion engine with which the automatic power transmission embodying the present invention is to be used is preferably provided with means to fully close the throttle valve of the carburetor 14 without respect to the position of the accelerator pedal 18 when the clutch assembly 20 is in the uncoupled condition. Such means is shown in FIG. 1 as including a vacuum-operated throttle valve actuator 120 which is connected to the throttle valve (not shown) of the carburetor 14 by a mechanical linkage 122 and which is controlled by a solenoid-operated control valve 124 communicating with the previously described vacuum passageway 68 through a branch passageway 126. The throttle valve actuator 120 is adapted to allow the carburetor throttle valve to be operated from the accelerator pedal 18 when the solenoid-operated control valve 124 is de-energized. When the control valve 124 is energized, the valve 124 is made open so that the vacuum in the branch passageway 126 acts on the throttle valve actuator 120, which thus drives the mechanical linkage 122 in a direction to move the throttle valve of the carburetor 14 into the angular position providing a minimum flow rate through the throttle valve. As will be described in more detail, the solenoid-operated control valve 124 is adapted to be energized when the clutch assembly 20 is in the uncoupled condition.

The exciting coils 58g, 60g, 62g, 64g and 80g of the valve units 58, 60, 62, 64 and 80 of the solenoid-operated vacuum control valve arrangement 36 for controlling the clutch assembly 20 are connected by lines 128, 130, 132, 134 and 136, respectively, and the exciting coils (not shown but assumed to be provided four in number as will be described later) of the solenoid-operated hydraulic system 116 are connected by lines 138, 140, 142 and 144 to output terminals of an electric control circuit 146 which is shown in a block form in FIG. 1. Likewise, the exciting coil (not shown) of the solenoid-operated control valve 124 for the throttle valve actuator 122 is connected to the control circuit 146 by a line 148.

Figure 3A:
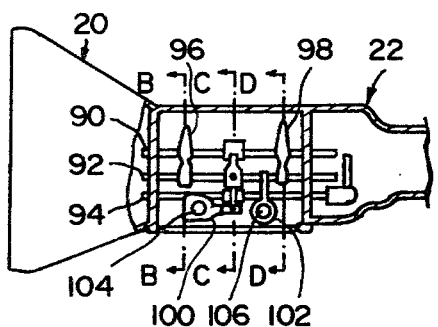
FIG. 3A is a partially cut-away view showing mechanical linkage means provided in association with the countershaft transmission gear assembly forming part of the power transmission illustrated in FIG. 1.
Figure 3B:
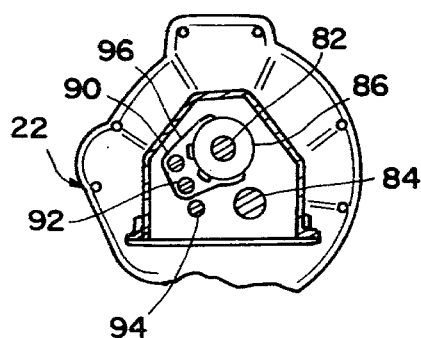
FIG. 3B is a cross sectional view taken along line B—B of FIG. 3A.
Figure 3C:
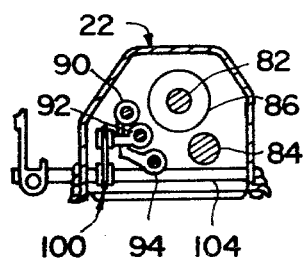
FIG. 3C is a cross sectional view taken along line C—C of FIG. 3A.
Figure 3D:
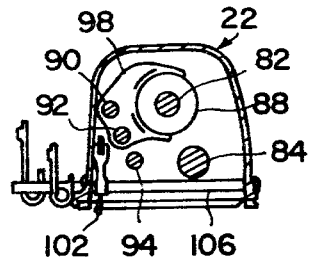
FIG. 3D is a cross sectional view taken along line D—D of FIG. 3A.
Figure 4:
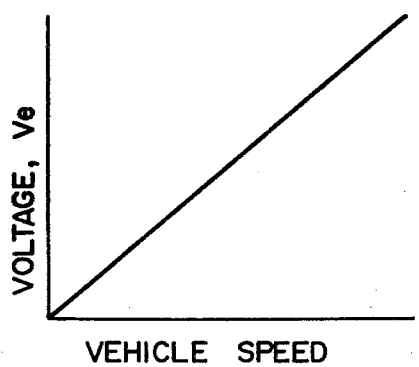
FIG. 4 is a graph showing an example of the voltage to constitute a signal representative of the vehicle speed to be detected in the power transmission embodying the present invention.
Figure 5:
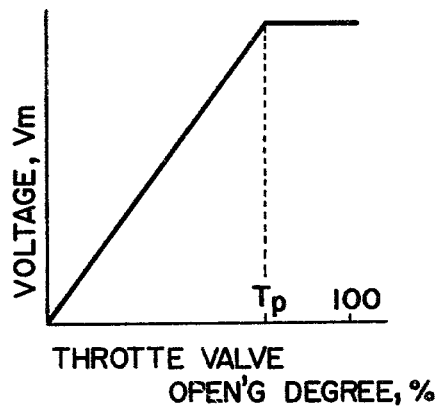
FIG. 5 is a graph similar to FIG. 4 but shows an example of the voltage to constitute a signal representative of the carburetor throttle valve opening degree to be detected in the power transmission embodying the present invention.

The control circuit 146 is supplied with input signals representative of various operational conditions of the vehicle. The signals include an idling signal Sa which is representative of the idling condition of the engine 10, viz., the condition in which the throttle valve of the carburetor is moved by the accelerator 18 to an angular position providing an opening degree less than a predetermined limit, clutch stroke signals Sb and Sb' representative of predetermined conditions of the clutch assembly 20, a forward-drive gear position signal Sc representative of a gear position selected in the automatic forward-drive range, a deceleration signal Sd representative of sudden deceleration of the vehicle as caused when the brake pedal 150 (FIG. 1) is depressed, a vehicle speed signal Se variable with the vehicle speed, a gearshift-lever position signal Sf representative of the gear position D, R, P or N selected by the gearshift lever 118, a cooling-water temperature signal Sg representative of the temperature of the engine cooling water which has circulated through the cooling water passageways in the engine block, a flywheel temperature signal Sh representative of the temperature of the flywheel (not shown) mounted on the crankshaft of the engine 10, a road inclination signal Si representative of the inclination of a sloping road surface on which the vehicle is running, an air-conditioner signal Sj representative of the condition in which the air conditioning unit (not shown) of the vehicle is operating on the cooling cycle, an engine speed signal Sk which is variable with the output speed of the engine, viz., the rotational speed of the crank-shaft of the engine 10, and a throttle-valve opening-degree signal Sm representative of the degree of opening of the throttle valve of the carburetor which is schematically shown at 14' to the right of FIG. 1. The idling signal Sa representative of the idling condition of the engine is produced by a suitable idling-condition detector 152 responsive to the movement of the acclerator pedal 18. The idling-condition detector 152 is electrically connected to an input terminal of the control circuit 146 by a line 154. To produce the clutch stroke signals Sb and Sb' representative of the predetermined conditions of the clutch assembly 20, the servo unit 34 for the master cylinder 32 has a plunger 156 which is securely connected at one end to the opposite side of the piston 48 of the servo unit 34 to the master cylinder 32 and which axially movably projects from the casing 44 of the servo unit 34 through the atmospheric chamber 52, as shown in FIG. 2. The plunger 156 is constructed of an electrically non-conductive material either in its entirety or at least in its leading end portion projecting from the casing 44. The casing 44 of the servo unit 34 has fixedly mounted thereon brackets 158 and 158' on which piston-stroke detector elements 160 and 160' are respectively mounted. The piston stroke detector elements 160 and 160' are positioned relative to the casing 44 and in conjunction with the plunger 156 in such a manner as to be contacted by the plunger 156 at different timings which correspond to predetermined conditions of the clutch assembly 20 being drive toward the fully coupled condition. When the clutch assembly 20 is thus being driven toward the fully coupled condition with the control chamber 50 open to the atmosphere and accordingly with the piston 48 of the servo unit 34 being moved in the direction of arrow e, viz., in the direction to produce expansion of the control chamber 50, the plunger 156 is brought into contact first with the piston-stroke detector element 160 closer to the casing 44 and thereafter with the other piston-stroke detector element 160', producing the signals Sb and Sb' at different timings as the piston 48 of the servo unit 34 is moved toward the extreme axial position in the direction of arrow e and as a consequence the clutch assembly 20 is being driven toward the fully coupled condition. The piston-stroke detector elements 160 and 160' are electrically connected by lines 162 and 162', respectively, to input terminals of the control circuit 146. On the other hand, the forward-drive gear position singal Sc representative of a gear position selected in the automatic forward-drive range is produced by a suitable gear-position detector unit 164 which is provided in conjunction with the transmission gear assembly 22 and which is electrically connected by a line 166 to an input terminal of the control circuit 146. The gear assembly 22 being herein assumed to be of the four-forward-speed type, the signal Sc delivered from the gear-position detector unit 164 is thus representative of the first, second, third or fourth gear condition $D_1$, $D_2$, $D_3$ or $D_4$ selected in the automatic forward-drive range which is established when the gearshift lever 118 is in the automatic forward-drive gear position D. The deceleration signal Sd is produced by a suitable deceleration detector 168 which is provided in conjunction with the brake pedal 150 of the vehicle and which is adapted to deliver the signal Sd when the brake pedal 150 is depressed beyond a predetermined limit. The deceleration detector 168 is electrically connected to an input terminal of the control circuit 146 by a line 170. The vehicle speed signal Se is produced by a suitable vehicle speed sensor 172 which may be constituted by a tachometric generator driven by the transmission mainshaft 82 (FIGS. 3B to 3D). The signal Se thus produced by the vehicle speed sensor 172 continuously varies with the revolution speed of the transmission mainshaft 82 and is delivered through a line 174 to the control circuit 146. More specifically, the vehicle speed signal Se is obtained as a positive voltage Ve which varies in direct proportion to the vehicle speed as indicated in FIG. 4. On the other hand, the gearshift-lever position singal Sf is produced by a suitable gearshift-lever position detector 176 provided in conjunction with the manually-operated gearshift lever 118 for being responsive to the movement of the gearshift lever 118 to the automatic forward-drive range position D, reverse drive position R, parking position P or neutral position N. The signal Sf thus produced by the gearshift-lever position detector 176 is fed to the control circuit 146 through a line 178. The cooling-water temperature signal Sg is produced by a suitable temperature sensor 180 projecting into a cooling jacket (not shown) of the engine 10. The signal Sg thus produced by the temperature sensor 180 varies with the temperature of the engine cooling water circulated through the cooling jacket of the engine and is fed to the control circuit 146 through a line 182. The flywheel temperature signal Sh is produced by a suitable temperature sensor 184 connected to the flywheel (not shown) mounted on the tail end of the crankshaft of the engine 10. The signal Sh thus produced by the temperature sensor 184 varies with the temperature of the engine flywheel and is fed to the control circuit 146 through a line 186. The road inclination signal Si is produced by, for example, an inclinometer 188 which is connected to an input terminal of the control circuit 146 by a line 190. The air-conditioner signal Sj representative of the condition in which the air conditioning unit (not shown) is operating on the cooling cycle is delivered from air-conditioner cooling-cycle detector 192 to the control circuit 146 by a line 194. The engine speed signal Sk is produced by a suitable engine speed sensor 196 such as a tachometric generator driven by the crankshaft of the engine 10 and is continuously variable with the revolution speed of the engine crankshaft. The signal Sk thus produced by the engine speed sensor 196 is fed to the control circuit 146 through a line 198. Furthermore, the throttle-valve opening-degree signal Sm is produced by a suitable opening-degree detector 200 provided in association with the throttle valve of the carburetor which is shown at 14' to the right of FIG. 1. The signal Sm thus produced by the opening degree detector 200 is continuously variable with the degree of opening of the carburetor throttle valve and is fed to the control circuit 146 through a line 202. More specifically, the throttle-valve opening-degree signal Sm is obtained as a positive voltage Vm which varies in direct proportion to the throttle valve opening degree when the throttle valve opening degree is lower than a predetermined percentage $T_p$ in terms of the full opening degree as 100 percent as indicated in FIG. 5. When the throttle valve is open providing an opening degree higher than the predetermined percentage $T_p$, the signal voltage Vm remains substantially constant regardless of the variation in the throttle valve opening degree. Each of the above described sensors and detectors is either well known per se or can be readily designed by those skilled in the art and, for this reason, detailed constructions and arrangements of such sensors and detectors are not herein shown.

Figure 6:
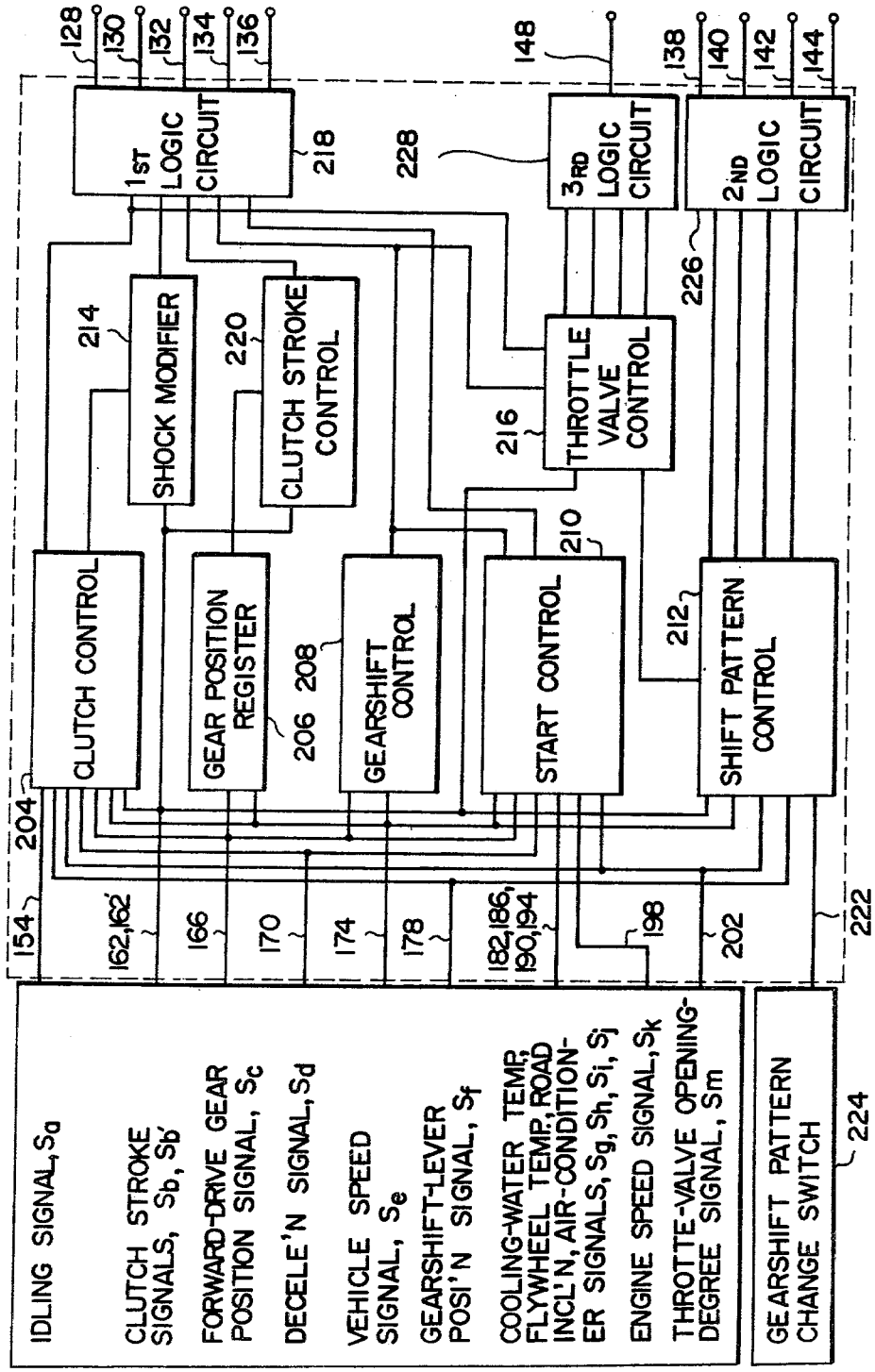
FIG. 6 is a block diagram showing a preferred example of the electric control circuit forming part of the power transmission illustrated in FIG. 1.

Referring to FIG. 6, the control circuit 146 supplied with the various input signals from these sensors and detectors comprises a clutch control circuit 204, a gear-position register circuit 206, a gearshift control circuit 208, a start control circuit 210 and a gearshift pattern control circuit 212. The clutch control circuit 204 has input terminals supplied with the idling signal Sa, clutch stroke signals Sb and Sb' forward-drive gear position signal Sc, deceleration signal Sd, gearshift-lever position signal Sf and throttle-valve opening-degree signal Sm through the lines 154, 162, 162', 166, 170, 178 and 202 and has an output terminal connected to an input terminal of a shock modifier circuit 214 and an output terminal connected to a throttle-valve control circuit 216 and one input terminal of a first logic circuit 218. The shock modifier circuit 214 has another input terminal connected to the piston-stroke detector elements 160 and 160' on the servo unit 34 (FIGS. 1 and 2) and is adapted to control the mechanical shocks to be produced when the clutch assembly 20 is actuated into the uncoupled condition, the output terminal of the shock modifier circuit 214 being connected to another input terminal of the first logic circuit 218. On the other hand, the gear position register circuit 206 has input terminals supplied with the forward-drive gear position signal Sc and vehicle speed signal Se through the lines 166 and 174 and has an output terminal connected to a clutch stroke control circuit 220 which is adapted to be supplied with the clutch stroke signals Sb and Sb' through the lines 162 and 162'. The output terminal of the clutch stroke control circuit 220 is connected to a third input terminal of the above-mentioned logic circuit 218. The gearshift control circuit 208 has input terminals which are also supplied with the forward-drive gear position signal Sc and vehicle speed signal Se through the lines 166 and 174, the output terminal of the gearshift control circuit 208 being connected to a fourth input terminal of the logic circuit 218 and further to the above-mentioned throttle-valve control circuit 216. The start control circuit 210 has input terminals connected to the lines 166, 170, 174, 182, 186, 190, 194, 198 and 202 and are thus supplied with the forward-drive gear position signal Sc, deceleration signal Sd, vehicle speed signal Se, engine-cooling water temperature signal Sg, flywheel temperature signal Sh, road inclination signal Si, air-conditioner signal Sj, engine speed signal Sk and throttle-valve opening-degree signal Sm. The start control circuit 210 has an output terminal connected to the above-mentioned fourth input terminal of the logic circuit 218 and an output terminal connected to a fifth input terminal of the logic circuit 218. The gearshift pattern control circuit 212 has input terminals connected to the lines 162, 162', 174, 178 and 202 and are thus supplied with the clutch stroke signals Sb and Sb', vehicle speed signal Se, gearshift-lever position signal Sf and throttle-valve opening-degree signal Sm. The gearshift pattern control circuit 212 further has an input terminal which is connected through a line 222 to a suitable d.c. power source (not shown) across a gearshift pattern change switch 224. The gearshift pattern control circuit 212 has output terminals one of which is connected to the throttle-valve control circuit 216 and the others of which are connected to input terminals of a second logic circuit 226. The throttle-valve control circuit 216 has output terminals connected to a third logic circuit 228. The first logic circuit 218 has first to fifth terminals which are respectively connected through the lines 128, 130, 132, 134 and 136 to the exciting coils 58g, 60g, 62g, 64g and 80g of the solenoid-operated valve units 58, 60, 62, 64 and 80 of the vacuum control valve arrangement 36 shown in FIG. 1 while the second logic circuit 226 has first to fourth output terminals which are respectively connected through the lines 138, 140, 142 and 144 to the exciting coils (not shown) of the solenoid-operated hydraulic control system 116 schematically shown in FIG. 1.

Figure 7:
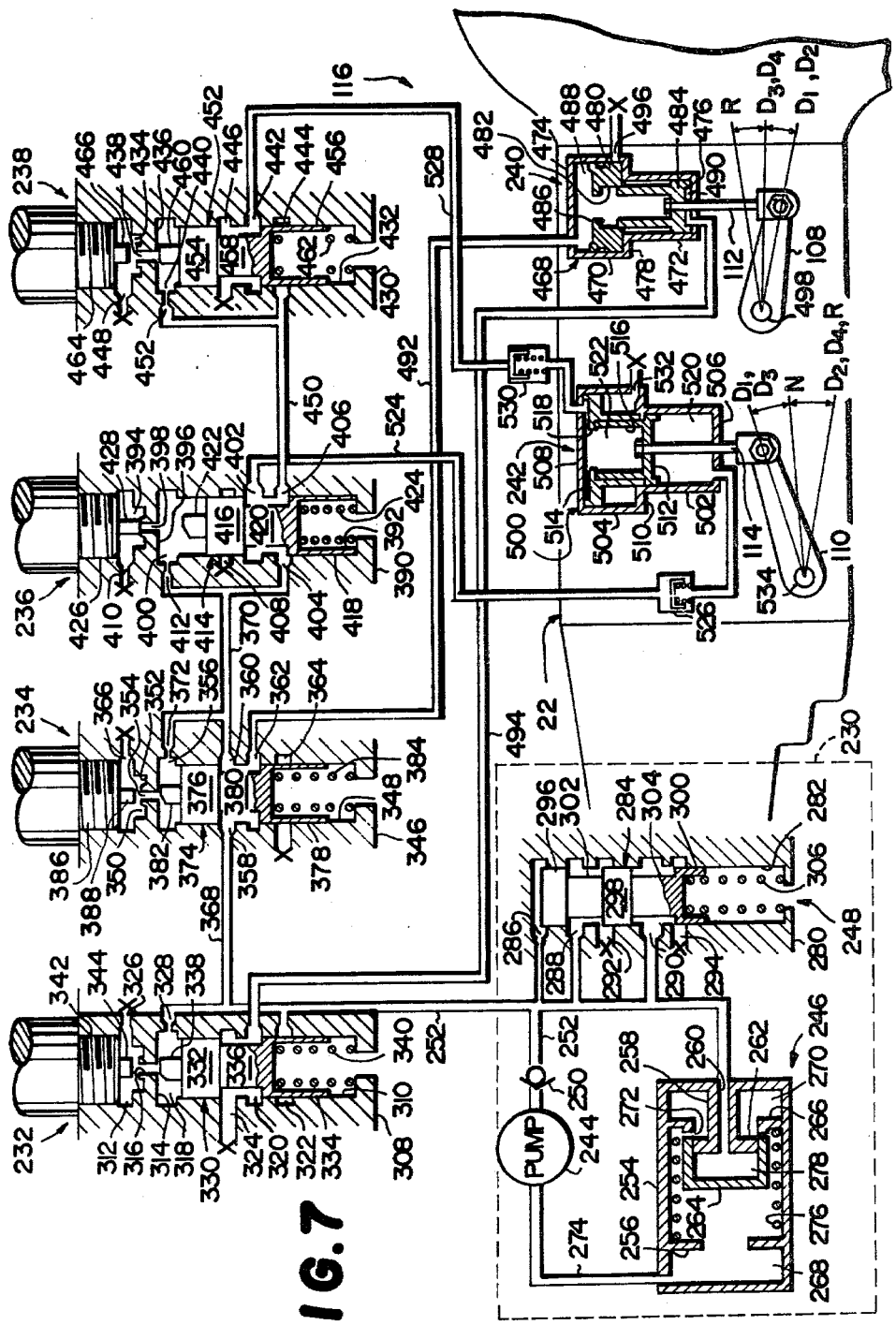
FIG. 7 is a schematic sectional view, partly in side elevation, showing a preferred example of the construction of the hydraulic control system forming part of the power transmission illustrated in FIG. 1.

Turning to FIG. 7 of the drawings, the solenoid-operated hydraulic control system 116 is adapted to hydraulically and selectively drive the previously described gear position selector linkage 100 and the gearshift control linkage 102 of the transmission gear assembly 22 shown in FIGS. 3A to 3D by means of the respectively associated gear-position selector and gearshift control levers 108 and 110 and the actuating rods 112 and 114 and is largely composed of a basic fluid pressure delivery unit 230, solenoid-operated first, second, third and fourth gearshift control valves 232, 234, 236 and 238 and first and second control cylinders 240 and 242 which are respectively associated with the gear-position selector and gearshift control levers 109 and 110.

The basic fluid pressure delivery unit 230 comprises a motor-driven constant-displacement pump 244, a pressure accumulator 246 and a pressure regulator valve 248. The pump 244 has a delivery port communicating through a one-way check valve 250 with a basic fluid pressure passageway 252. The pressure accumulator 246 has a casing 254 formed with an internal flange 256 and an internal projection 258 axially extending inwardly from an end wall of the casing 254 and formed with an axial bore 260 which is open at the leading end of the projection 258 and which is in constant communication with the basic fluid pressure passageway 252, the projection 258 having an annular flange portion 262 at its innermost leading end. A generally cup-shaped piston 264 has an inner peripheral surface axially slidably received on the flange portion 262 of the projection 258 and further has an external flange 266 axially slidably received on the inner peripheral surface of the casing 254. The piston 264 thus axially movable within the casing 254 divides the internal space of the casing 254 into two separate variable-volume chambers 268 and 270. The piston 264 is formed with a suitable number of orifices 272 providing constant but restricted communication between these variable-volume chambers 268 and 270. One variable-volume chamber 268 is in constant communication with the suction port of the pump 244 through a passageway 274 so that suction is developed in the chamber 268 and, through the orifices 272, in the other variable-volume chamber 270. A preloaded helical compression spring 276 is seated at one end on the internal flange 256 of the casing 254 and at the other end on the external flange 266 of the piston 264, which is accordingly urged to axially move in a direction to expand the variable-volume chamber 268 and contract the variable-volume chamber 270. Between the piston 264 and the flange portion 262 of the projection 268 of the casing 254 is formed an open space 278 which is in constant communication with the basic fluid pressure passageway 252 through the axial bore 260 in the projection 258. The open space 278 is biased to contract by the piston 264 which is urged by the compression spring 276 to move in the direction to contact the chamber 270. When a fluid pressure obtains in the basic fluid pressure passageway 252 and accordingly in the open space 278 through the axial bore 260 in the projection 258 of the casing 254, the piston 264 is moved against the force of the compression spring 276 in the reverse direction to expand the open space 278 so that the fluid pressure is accumulated in the space 278.

The pressure regulator valve 248 comprises a valve casing 280 formed with an elongated bore 282 in which a valve spool 284 is axially movable. The casing 280 is further formed with first, second and third fluid inlet ports 286, 288 and 290 and first and second drain ports 292 and 294, the inlet ports 286, 288 and 290 being in constant communication with the basic fluid pressure passageway 252. The valve spool 284 has first, second and third lands 296, 298 and 300 having substantially equal sectional areas. The second land 298 is located intermediate between the first and third lands 296 and 300 and is axially spaced apart from the lands 296 and 300, forming a first circumferential groove 302 between the first and second lands 286 and 298 and a second circumferential groove 304 between the second and third lands 298 and 300. The valve spool 284 is urged by means of a preloaded helical compression spring 306 to axially move in a direction to have the second and third lands 298 and 300 located to cover the first and second drain ports 292 and 294, respectively. The basic fluid pressure developed in the first fluid inlet port 286 constantly acts on the end face of the first land 296 of the valve spool 284 and urges the valve spool 284 to axially move in the opposite direction against the force of the compression spring 306 so that the second land 298 is moved past the first drain port 292 and thereafter the third land 300 is moved past the second drain port 294. As the valve spool 284 is thus moved against the force of the compression spring 306 by the fluid pressure acting on the end face of the first land 296 of the valve spool 284, progressively increasing communication is established first between the second fluid inlet port 288 and the first drain port 292 through the first circumferential groove 302 in the valve spool 284 and thereafter between the third fluid inlet port 290 and the second drain port 294 through the second circumferential groove 304 in the valve spool 284 with the result that the fluid in the basic fluid pressure passageway 252 is discharged from the first drain port 292 or both of the first and second drain ports 292 and 294. The basic fluid pressure in the passageway 252 is thus constantly regulated toward a predetermined level which is achieved when the force resulting from the fluid pressure acting on the end face of the first land 296 of the valve spool 284 is equalized with the opposing force of the compression spring 306.

The first gearshift control valve 232 comprises a valve casing 308 formed with first and second valve chambers 310 and 312 which are disposed on both sides of an internal partition wall 314 forming part of the valve casing 308. The internal wall portion 314 is formed with an aperture 316 through which the first and second valve chambers 310 and 312 are communicable with each other. The valve casing 308 is further formed with first, second and third control ports 318, 320 and 322 and first and second drain ports 324 and 326. The first and third control ports 318 and 322 are in constant communication with the basic fluid pressure passageway 252. The first drain port 324 is communicable with the first valve chamber 310 while the second drain port 326 is in constant communication with the second valve chamber 312. Between the first control port 318 and the basic fluid pressure passageway 252 is preferably formed an orifice 328 as shown. A valve spool 330 having first and second lands 332 and 334 is axially movable in the first valve chamber 310. The first and second lands 332 and 334 are axially spaced apart from each other and form therebetween a circumferential groove 336 to which the second control port 320 is constantly open without respect to the axial relative position of the valve spool 330 within the valve chamber 310 and with which the third control port 322 and the first drain port 324 are communicable depending upon the axial relative position of the valve spool 330 in the first valve chamber 310. The second land 334 is formed with a bore hole which is open at the outer axial end of the land. The valve spool 330 further has an axial projection 338 extending from the outer end face of the first land 332 toward the aperture 316 in the internal partition wall 314 of the valve casing 308. The valve spool 330 is axially movable between a first position closing the third control port 322 by the second land 334 thereof and providing communication between the second control port 320 and the first drain port 324 through the circumferential groove 336 in the valve spool 330 as shown and a second position closing the first drain port 324 by the first land 332 thereof and providing communication between the second and third fluid inlet ports 320 and 322 through the circumferential groove 336 in the valve spool 330. When the valve spool 330 is in the first position thereof, the axial projection 338 on the first land 332 of the valve spool 330 bears at its end against the inner face of the internal partition wall 314 of the casing 308 as shown and holds the first land 332 of the valve spool 330 at a certain spacing from the inner face of the partition wall 314 while allowing the first control port 318 to be open to the aperture 316 in the partition wall 314 and thereby establishing communication between the first control port 318 and second valve chamber 312 through the aperture 316. The valve spool 330 is urged to axially move toward the first position thereof by suitable biasing means such as a preloaded helical compression spring 340 which is seated at one end on the bottom of the bore hole in the second land 334 of the valve spool 330 and at the other end on the inner face of an end wall of the valve casing 308. A solenoid plunger 342 having an axial projection 334 at its leading end projects into the second valve chamber 312 and is axially movable between a first position spaced apart from the partition wall 314 and thus providing communication between the second drain port 326 and the aperture 316 in the partition wall 314 through the second valve chamber 312 as shown and a second position having the axial projection 344 in contact with the partition wall 314 and thus closing the aperture 316 by the projection 344. The solenoid plunger 342 is associated with an exciting coil (not shown) which is connected by the line 138 to the first output terminal of the second logic circuit 226 of the control circuit 146 shown in FIG. 6. The solenoid plunger 342 is assumed to be urged to move toward the first position thereof by the suitable biasing means (not shown) and to be moved against the force of the biasing means into the second position thereof when the associated exciting coil is energized through the second logic circuit 226.

The second gearshift control valve 234 comprises a valve casing 346 formed with first and second valve chambers 348 and 350 which are separated from each other by an internal partition wall 352 forming part of the casing 346. The partition wall 352 is formed with an aperture 354 through which the first and second valve chambers 348, 350 are communicable with each other. The valve casing 346 is further formed with first, second, third and fourth control ports 356, 358, 360 and 363 and first and second drain ports 364 and 366. The second control port 358 is in constant communication with the basic fluid pressure passageway 252 through a fluid passageway 368 while the third control port 360 is in constant communication with a fluid passageway 370. The second and third control ports 358 and 360 merge with each other around the first valve chamber 348 so that constant communication is established between the fluid passageways 368 and 370. The first control port 356 is in constant communication with the fluid passageway 370 preferably through an orifice 372 as shown. The first drain port 364 is communicable with the first valve chamber 348 while the second drain port 366 is in constant communication with the second valve chamber 350. Within the first valve chamber 348 is axially movable a valve spool 374 having first and second lands 376 and 378 which are axially spaced apart from each other and therebetween a circumferential groove 380 to which the fourth control port 362 is constantly open irrespective of the axial relative position of the valve spool 374 within the valve chamber 348 and with which either each of the second and third control ports 358 and 360 or the first drain port 364 is in communication depending upon the axial relative position of the valve spool 374 in the first valve chamber 348. The second land 378 of the valve spool 374 is formed with a bore hole which is open at the outer axial end of the land as shown. The valve spool 374 further has an axial projection 382 extending from the outer end face of the first land 376 toward the aperture 354 in the internal partition wall 352 of the valve casing 346. The valve spool 374 is thus axially movable between a first position closing the first drain port 364 by the second land 378 thereof and providing communication between the fourth control port 362 and each of the second and third control ports 358 and 360 through the circumferential groove 380 in the valve spool 374 as shown and a second position blocking the particular communication by the first land 376 thereof and providing communication between the fourth control port 362 and the first drain port 364 through the circumferential groove 380 in the spool 374. While maintaining the communication between the second and third control ports 358 and 360. When the valve spool 374 is in the first position thereof, the axial projection 382 on the first land 376 of the valve spool 374 bears at its end against the inner face of the internal partition wall 352 of the valve casing 346 as shown and holds the first land 376 of the valve spool 374 at a certain spacing from the inner face of the partition wall 352 while allowing the first port 356 to be open to the aperture 354 in the partition wall 352 and thereby establishing communication between the first control port 356 and the second valve chamber 350 through the aperture 354. The valve spool 374 is urged to axially move toward the first position thereof by suitable biasing means such as a preloaded helical compression spring 384 which is seated at one end on the bottom of the bore hole in the second land 378 of the valve spool 374 and at the other end on the inner face of an end wall portion of the valve casing 348. A solenoid plunger 386 having an axial projection 388 at its leading end projects into the second valve chamber 350 and is axially movable between a first position spaced apart from the partition wall 352 and thus providing communication between the second drain port 366 and the aperture 354 in the partition wall 352 through the second valve chamber 350 as shown and a second position having the axial projection 388 in contact with the partition wall 352 and thereby closing the aperture 354 by the projection 388. The solenoid plunger 386 is associated with an exciting coil (not shown) which is connected by the line 140 to the second output terminal of the second logic circuit 226 of the control circuit 146 shown in FIG. 6. Similarly to the solenoid plunger 342 of the first gearshift control valve 232, the solenoid plunger 386 of the second gearshift control valve 234 is assumed to be urged to move toward the first position thereof by suitable biasing means (not shown) and to be moved against the force of the biasing means into the second position thereof when the associated exciting coil is energized through the line 140.

The third gearshift control valve 236 comprises a valve casing 390 in which are formed first and second valve chambers 392 and 394. The first and second valve chambers 392 and 394 are separated from each other by an internal partition wall 396 which forms part of the valve casing 390 and which is formed with an aperture 398 through which the valve chambers 392 and 394 are communicable with each other. The valve casing 390 is further formed with first, second, third and fourth control ports 400, 402, 404 and 406 and first and second drain ports 408 and 410. The first and third control ports 400 and 404 are in constant communication with the fluid passageway 370 leading from the third control port 360 of the second gearshift control valve 234, the first control port 400 being in communication with the passageway 370 preferably through an orifice 412 as shown while the third and fourth port 404 and 406 merging with each other the first valve chamber 392. The first drain port 408 is communicable with the first valve chamber 394 while the second drain port 410 is constantly open to the second valve chamber 394. Within the first valve chamber 392 is axially movable a valve spool 414 having first and second lands 416 and 418 which are axially spaced apart from each other and from therebetween a circumferential groove 420 to which the second control port 402 is constantly open without respect to the relative position of the valve spool 414 within the valve chamber 392 and with which either each of the third and fourth control ports 404 and 406 or the first drain port 408 is in communication depending upon the axial relative position of the valve spool 414 in the first valve chamber 392. The second land 418 is formed with a bore hole which is open at the outer axial end of the land 418, as shown. The valve spool 414 further has an axial projection 422 which extends from the outer end face of the first land 416 of the valve spool 414 toward the aperture 398 in the internal partition wall 396 of the valve casing 390. The valve spool 414 is thus axially movable between a first position isolating the second control port 402 from the third and fourth control ports 404 and 406 (which are in constant communication with each other) by the second land 418 thereof and providing communication between the second control port 402 and the first drain port 408 through the circumferential groove 420 in the valve spool 414 and a second position closing the first drain port 408 and providing communication between the second control port 402 and each of the third and fourth ports 404 and 406 through the circumferential groove 420 in the valve spool 414 as shown. When the valve spool 414 is in the first position thereof, the axial projection 422 on the first land 416 of the valve spool 414 bears at its end against the inner face of the internal partition wall 396 of the valve casing 390 and holds the first land 416 of the valve spool 414 at a certain spacing from the inner face of the partition wall 396 while allowing the first control port 400 to open to the aperture 398 in the partition wall 396 and thereby establishing communication between the first control port 400 and the second valve chamber 394 through the aperture 198. The valve spool 414 is urged to axially move toward the first position thereof by suitable biasing means such as a preloaded helical compression spring 424 which is seated at one end on the bottom of the bore hole in the second land 418 of the valve spool 414 and at the other end on the inner face of an end wall portion of the valve casing 390. A solenoid plunger 426 having an axial projection 428 at its leading end projects into the second valve chamber 394 and is axially movable between a first position axially spaced apart from the internal partition wall 396 of the valve casing 390 and thus allowing the aperture 398 in the partition wall 396 to open to the second valve chamber 394 and a second position having the axial projection 428 in contact with the partition wall 396 and thereby isolating the aperture 398 from the second valve chamber 394 as shown. The solenoid plunger 426 is associated with an exciting coil (not shown) which is connected to the line 142 to the third output terminal of the second logic circuit 226 of the control circuit 146 shown in FIG. 6. As in the first and second gearshift control valves 232 and 234, the solenoid plunger 426 of the third gearshift control valve 236 is assumed to be urged to axially move toward the first position thereof by suitable biasing means (not shown) and to be axially moved from the first position to the second position thereof when the associated exciting coil is energized through the line 142.

On the other hand, the fourth gearshift control valve 238 comprises a valve casing 430 which is formed with first and second valve chambers 432 and 434. The first and second valve chambers 432 and 434 are separated from each other by an internal partition wall 436 formed with an aperture 438 through which the valve chambers 432 and 434 are communicable with each other. The valve casing 430 is further formed with first, second and third control ports 440, 442 and 444 and first and second drain ports 446 and 448. The first and third control ports 440 and 444 are in constant communication with the fourth port 406 of the third gearshift control valve 236 through a fluid passageway 450, the first control port 440 being in communication with the passageway 450 through an orifice 452. The first drain port 446 is communicable with the first valve chamber 432 while the second drain port 448 is constantly open to the second valve chamber 434. Within the first valve chamber 432 is amounted a valve spool 452 which has first and second lands 454 and 456, the second land 456 being formed with a bore hole which is open at the outer axial end of the land 456. The first and second lands 454 and 456 are axially spaced apart from each other and form therebetween a circumferential groove 458 to which the third control port 444 is constantly open without respect to the axial relative position of the valve spool 452 within the valve chamber 432. The valve spool 452 further has an axial projection 460 extending from the outer end face of the first land 454 toward the aperture 438 in the internal partition wall 436 of the valve casing 430. The valve spool 452 is thus axially movable between a first position closing the third control port 444 by the second land 456 of the valve spool 452 and providing communication between the second control part 442 and the first drain port 446 through the circumferential groove 458 in the valve spool 452 as shown and a second position closing the first drain port 446 and providing communication between the second and third control ports 442 and 444 through the circumferential groove 458 in the valve spool 452. When the valve spool 452 is in the first position thereof, the axial projection 460 on the first land 454 of the valve spool 452 is in contact at its end with the inner face of the partition wall 436 of the valve casing 430 as shown and holds the first land 454 of the valve spool 452 at a certain spacing from the inner face of the partition wall 436 while allowing the first control port 440 to be open to the aperture 438 in the partition wall 436 and thereby establishing communication between the first control port 440 and the second valve chamber 434 through the aperture 438. The valve spool 452 is urged to axially move toward the first position thereof by suitable biasing means such as a preloaded helical compression spring 462 which is seated at one end on the bottom of the bore hole in the second land 456 of the valve spool 452 and at the other end on the inner face of an end wall portion of the valve casing 430 as shown. A solenoid plunger 464 having an axial projection 466 at its leading end projects into the second valve chamber 434 and is axially movable between a first position spaced apart from the partition wall 436 of the valve casing 430 and thus allowing the aperture 438 in the partition wall 436 to open to the second valve chamber 434 as shown and a second position having the axial projection 466 in contact with the partition wall 436 and thus closing the aperture 434 in the partition wall 436 by the axial projection 466. The solenoid plunger 464 is associated with an exciting coil (not shown) which is connected by the line 144 to the fourth output terminal of the second logic circuit 226 of the control circuit 146 shown in FIG. 6. As in the first to third gearshift control valves 232, 234 and 236 previously described, the solenoid plunger 464 in the fourth gearshift valve 238 is assumed to be urged to move toward the first position thereof by suitable biasing means (not shown) and to be moved against the force of the biasing means from the first position into the second position thereof when the associated exciting coil is energized through the line 144.

Still referring to FIG. 7, the first control cylinder 240 associated with the previously mentioned gear-position selector lever 108 comprises a cylinder casing 468 consisting of first and second axial sections 470 and 472 having end walls 474 and 476, respectively. The first axial section 470 is larger in cross sectional area than the second axial section 472 and is integral with the latter through an annular wall portion 478. The first control cylinder 240 further comprises a first piston 480 axially slidable on the inner peripheral surface of the first axial section 470 and formed with an axial bore 482 which is open at both axial ends of the piston 480 and a second piston 484 which is axially slidable on the inner peripheral surface of the second axial section 472 and which is further axially movable through the axial bore 482 in the first piston 480, the first and second pistons 480 and 484 being thus axially movable relative to each other within the cylinder casing 468. The first piston 480 is further formed with an annular internal flange 486 at its axial end closer to the end wall 474 of the cylinder casing 468 so that the second piston 484 is engageable at its inner axial end with the flange 486 through the axial bore 482 in the first piston 480 and is axially movable together with the second piston 484 when the second piston 484 is moved away from the end wall 476 of the second axial section 472 of the casing 468, the flange 486 thus serving as a stop for limiting the axial movement of the second piston 484 relative to the first piston 480 when the second piston 484 is axially moved away from the end wall 476. The axial movement of the first piston 480 away from the end wall 474 of the first axial section 470 of the cylinder casing 468 is limited by the annular wall portion 478 with which the first piston 480 is engageable at its inner axial end when moved away from the end wall 474. Within the cylinder casing 468 having the first and second pistons 480 and 484 thus arranged therein are formed first and second variable-volume fluid chambers 488 and 490 which are hermetically separated from each other across the combination of the pistons 480 and 482. The first variable-volume fluid chamber 488 is in constant communication with the fourth control port 362 of the second gearshift control valve 234 through a fluid passageway 492 while the second variable-volume fluid chamber 492 is in constant communication with the second control port 320 of the first gearshift control valve 232 through a fluid passageway 494. The cylinder casing 468 is further formed with a drain or breather port 496 which is communicable with an open space formed between the first and second pistons 480 and 484. The second piston 484 is connected to the actuating rod 112 connected to the previously mentioned gear position selector lever 108. The actuating rod 112 is axially movably passed through the end wall 476 of the second axial section 472 of the cylinder casing 468 and is connected securely at one end to the second piston 484 and pivotally at the other end to the gear-position selector lever 108. The gear-position selector lever 108 is rotatable about the center axis of a shaft 498 between a first angular position to produce the first or second forward-drive gear condition $D_1$ or $D_2$ in the transmission gear assembly 22 through the previously described gear-position selector linkage 100 (FIG. 1), a second angular position to produce the third or fourth gear condition $D_3$ or $D_4$ in the transmission gear assembly 22, and a third angular position to produce the reverse-drive gear condition R in the gear assembly 22, the first and third angular positions being the opposite limit angular positions of the lever 108 and the second angular position being intermediate between such first and third angular positions as shown. The second piston 484 in the cylinder casing 468 has first, second and third axial positions with respect to the casing 468. The first axial position of the second piston 484 corresponds to the first angular position of the gear-position selector lever 108 and is achieved when the second piston 484 is axially moved into contact with the inner face of the end wall 476 of the second axial section 472 of the casing 468 and produces a minimum volume in the second variable-volume fluid chamber 490 as shown. The third axial position of the second piston 484 corresponds to the third angular position of the gear-position selector lever 108 and is achieved when the second piston 484 is axially moved away from the end wall 476 of the second axial section 472 of the casing 468 into a limit position forced against the internal flange 486 of the first piston 480 which is moved into contact with the inner face of the end wall 474 of the first axial section 470 of the cylinder casing 468. The second axial position of the second piston 484 corresponds to the second angular position of the gear-position selector lever 108 and is achieved when the first piston 480 is forced against the inner face of the annular wall portion 478 between the first and second axial sections 470 and 472 of the cylinder casing 468 as shown and at the same time the second piston 484 is forced against the internal flange 486 of the first piston 480 thus positioned.

On the other hand, the second control cylinder 242 associated with the previously mentioned gearshift control lever 110 comprises a cylinder casing 500 which consists of first and second axial sections 502 and 504 which have respective end walls 506 and 508. The first axial section 502 is smaller in cross sectional area than the second axial section 504 and is integral with the latter through an annular wall portion 510. The second control cylinder 242 further comprises first and second pistons 512 and 514 which are configured essentially similarly to the second and first pistons 484 and 480, respectively, of the first control cylinder 240. Thus, the second piston 514 is axially slidable on the inner peripheral surface of the second axial section 504 of the cylinder casing 500 and is formed with an axial bore 516 which is open at both axial ends of the piston 514, while the first piston 512 is axially slidable on the inner peripheral surface of the piston 514 is connected to the actuating rod 114 connected to the previously mentioned gearshift control lever 110. The actuating rod 114 is axially movably passed through the end wall 506 of the first axial section 502 of the cylinder casing 500 and is connected securely at one end to the first piston 512 and pivotally at the other end to the gearshift control lever 110. The gearshift control lever 110 is rotatable about the center axis of a shaft 534 between a first angular position to produce the first or third forward-drive gear condition D₁ or D₃ in the transmission gear assembly 22 through the previously described gearshift control linkage 102 (FIG. 1), a second angular position to produce the neutral gear condition N in the transmission gear assembly 22, and a third angular position to produce the second gear condition D₂ or D₄ or the fourth forward-drive or reverse-drive gear condition R in the gear assembly 22, wherein the first and third angular positions are the opposite limit angular positions of the lever 110 and the second angular position is intermediate between such first and third angular positions. The first piston 512 in the cylinder casing 500 is thus movable between first, second and third axial positions which are respectively in correspondence with the first, second and third angular positions of the gearshift control lever 110. The first axial position of the first piston 512 and accordingly the first angular position of the gearshift control lever 110 are thus achieved when the second piston 514 is moved into contact with the inner face of the end wall 508 of the second axial section 504 of the cylinder casing 500 and at the same time the first piston 512 is axially moved away from the end wall 506 of the first axial section 502 of the casing 100 into a limit position forced at its inner axial end against the internal flange 518 of the second piston 514 thus positioned. The third axial position of the first piston 512 and accordingly the second angular position of the gearshift control lever 110 are achieved when the first piston 512 is axially moved into contact with the inner face of the end wall 506 of the first axial section 502 of the cylinder casing 500. The second axial position of the first piston 512 and accordingly the second angular position of the gearshift control lever 110 are achieved when the second piston 514 is forced at its inner axial end against the inner face of the annular wall portion 510 of the casing 500 and at the same time the first piston 512 is received at its inner axial end on the internal flange 518 of the second piston 514. The pistons of the first and second control valves 240 and 242 are moved into any of the above described axial positions under the control of the first to fourth gearshift control valves 232, 234, 236 and 238.

The operation of the automatic power transmission thus constructed and arranged will be hereinafter described with concurrent reference to FIGS. 1 to 7.

Figure 8A:
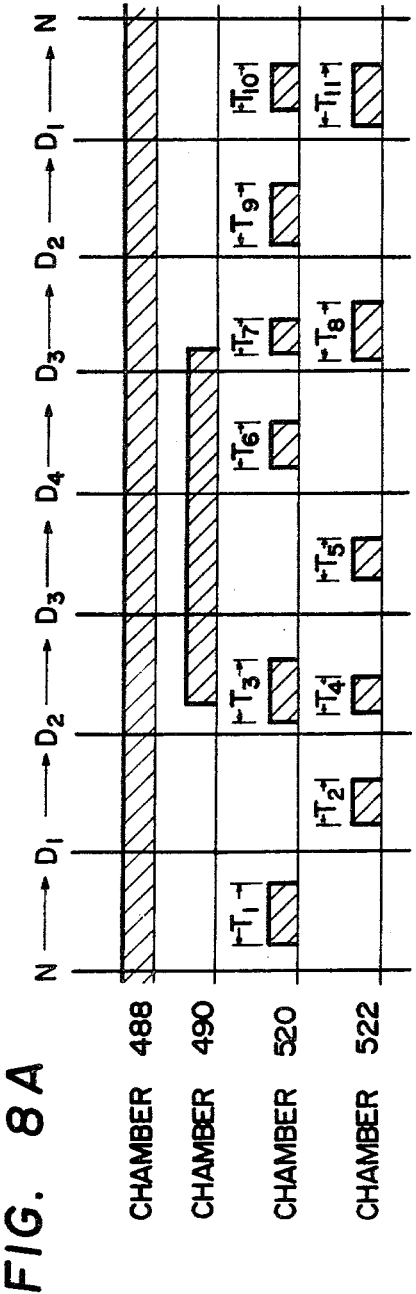
FIG. 8A is a diagram showing the schedules in accordance with which fluid pressures are developed in the fluid-operated control pistons in the hydraulic control system of FIG. 7 when shifts are to be made from the neutral to first, first to second, second to third and third to fourth forward-drive gears and backwardly from the fourth to third, third to second, second to first and first to neutral gears.

When the engine 10 (FIG. 1) is started from the rest condition, the motor-driven fluid delivery pump 244 is initiated into motion to deliver fluid pressure to the pressure accumulator 246 and pressure regulator valve 248. On the other hand, vacuum is developed in the intake manifold 14 of the engine 10 with the throttle valve in the carburetor 14 held in the fully closed position and is accumulated in the vacuum reservoir 70 through the vacuum passageway 68. Under these conditions, the lines 128, 130, 132, 134 and 136 connected to the exciting coils 58g, 60g, 62g, 64g and 80g of the solenoid-operated valve units 58, 60, 62, 64 and 80, respectively, of the vacuum control valve arrangement 36 for the clutch assembly 20, the lines 138, 140, 142 and 144 connected to the exciting coils of the solenoid-operated gearshift control valves 232, 234, 236 and 238, respectively, and the line 148 connected to the exciting coil of the solenoid-operated control valve 124 for the throttle valve of the carburetor 14 all remain de-energized in the absence of output signals at all of the output terminals of the control circuit 146. The respective exciting coils 58g, 60g, 62g and 64g of the first, second, third and fourth vacuum control valve units 58, 60, 62 and 64 being thus kept de-energized, the valve elements 58e, 60e, 62e and 64e of the valve units are all held in the respective first axial positions thereof by the forces of the associated compression springs 58f, 60f, 62f and 64f with the result that communication is established between the first and third port 58a and 58c, 60a and 60c, 62a and 62c and 64a and 64c of the valves 58, 60, 62 and 64 and accordingly between the first port 58a of the first valve unit 58 and the third port 64c of the fourth valve unit 64 through the passageway 78 between the third and fourth valve units 62 and 64, the passageway 76 between the second and third valve units 60 and 62 and the passageway 74 between the first and second valve units 58 and 60, as shown in FIG. 2. The control chamber 50 of the servo unit 34 for the master cylinder 32 is therefore open to the atmosphere through the third port 64c of the fourth valve unit 64 and is maintained in the extreme axial position in the direction of the arrow e by the fluid pressure in the cylinder chamber 38 of the master cylinder 32, allowing the clutch assembly 20 to remain in the fully coupled condition. With the lines 138, 140, 142 and 144 kept de-energized, furthermore, the respective solenoid plungers 342, 388, 426 and 464 of the first, second, third and fourth gearshift control valves 232, 234, 236 and 238 are held in the respective first axial positions thereof, allowing the apertures 316, 354, 398 and 438 in the internal partition walls 314, 352, 396 and 436 of the respective valve casings 308, 346, 390 and 430 of the valves 232, 234, 236 and 238 to open to the respective second valve chambers 312, 350, 394 and 434 of the valves. The respective first control ports 318, 356, 400 and 440 of the gearshift control valves 232, 234, 236 and 238 are thus held in communication with the respective second drain ports 326, 366, 410 and 448 of the valves through the apertures 316, 354, 398 and 438 in the partition walls 314, 352, 396 and 436, respectively. In the absence of the fluid pressure in the respective first control ports 318, 356, 400 and 440 of the gearshift control valves 232, 234, 236 and 238, the respective valve spools 330, 374, 414 and 452 of the valves are all held in the first positions thereof by the forces of the respectively associated compression springs 340, 384, 424 and 462. Under these conditions, the fluid passageway 492 between the first variable-volume fluid chamber 488 of the first control cylinder 240 and the fourth control port 362 of the second gearshift control valve 234 is in communication with the basic fluid pressure passageway 252 through the circumferential groove 380 in the valve spool 382 and the second control port 358 of the valve 234 and the passageway 368, while the fluid passageway 494 between the second variable-volume chamber 490 of the first control cylinder 240 and the second control port 320 of the first gearshift control valve 232 is in communication with the first drain port 324 through the circumferential groove 336 in the valve spool 330 of the control valve 232. The basic fluid pressure developed in the basic fluid pressure passageway 252 is therefore directed through the passageway 492 into the first variable-volume fluid chamber 488 of the control cylinder 240 so that the first piston 480 is forced against the inner face of the annular wall portion 478 of the cylinder casing 468 and simultaneously the second piston 484 is held in the previously mentioned first axial position bearing against the inner face of the end wall 476 of the second axial section 472 of the cylinder casing 468 in the absence of fluid pressure in the fluid passageway 494 and accordingly in the second variable-volume fluid chamber 490. The gear-position selector lever 108 is therefore held in the first angular position to produce the first or second forward-drive gear condition $D_1$ or $D_2$ in the transmission gear assembly 22 shown in FIGS. 3A to 3D. On the other hand, the fluid passageway 524 between the first variable-volume chamber 520 of the second control cylinder 242 and the second control port 402 of the third gearshift control valve 236 is in communication with the drain port 408 through the circumferential groove 420 in the valve spool 414 of the valve 236, while the fluid passageway 528 between the second variable-volume fluid chamber 522 and the second control port 442 of the fourth gearshift control valve 238 is in communication with the drain port 446 through the circumferential groove 458 in the valve spool 452 of the valve 238 as shown. The first and second pistons 512 and 514 of the second control cylinder 242 are therefore free to axially move in the cylinder casing 500 in the absence of fluid pressure in both of the first and second fluid chambers 520 and 522. If the manually-operated gearshift lever 118 is held in the neutral position N under these conditions, the gearshift control lever 110 connected to the gearshift lever 118 through the gearshift control linkage 102 (FIG. 3A) assumes the second angular position to produce the neutral gear condition in the transmission gear assembly 22. Thus, when the gearshift lever 118 is in the neutral position N with the exciting coils of all the gearshift control valves 232, 234, 236 and 238 kept de-energized, fluid pressure obtains only in the first fluid chamber 488 of the first control cylinder 240, as shown in FIG. 8A.

When the manually-operated gearshift lever 118 is then moved by a vehicle driver from the neutral position N to the automatic forward-drive position D, the gearshift-lever position signal Sf which is representative of the forward-drive position D of the gearshift lever 118 is fed from the gearshift-lever position detector 176 to the control circuit 146 of FIG. 6 through the line 178. The signal Sf is supplied to the clutch control circuit 204 which causes the first logic circuit 218 to produce an output signal at the first output terminal connected through the line 128 to the exciting coil 58g of the first vacuum control valve unit 58 shown in FIG. 2. The exciting coil 58g of the valve unit 58 is thus energized and drives the associated valve element 58e to move against the force of the compression spring 58f into the second axial position thereof closing the third port 58c and providing communication between the first and second ports 58a and 58b of the valve unit 58. The vacuum passageway 68 leading from the intake manifold 16 of the engine 10 is now permitted to communicate with the passageway 66 through the first vacuum control valve unit 58 so that vacuum is developed in the control chamber 50 of the servo unit 34 for the master cylinder and urges the diaphragm 46 of the servo unit 34 to move in a direction to contract the control chamber 50. The diaphragm-operated piston 48 of the servo motor 34 is moved in the direction of the arrow d and causes the clutch assembly 20 to uncouple by the fluid pressure developed in the master cylinder 32 and accordingly the clutch drive cylinder 28. The gearshift-lever position signal Sf is further fed to the gearshift pattern control circuit 212, which then causes the second logic circuit 226 to produce an output signal at the third output terminal for a predetermined period of time which is indicated by $T_1$ in FIG. 8A. The third output terminal of the logic circuit 226 being connected to the exciting coil of the third gearshift control valve 236 through the line 142, the solenoid plunger 426 of the valve 236 is now driven to axially move into the second position thereof closing the aperture 398 between the first and second valve chambers 392 and 394 of the valve 236. The first control port 400 of the third gearshift control valve 236 is isolated from the drain port 410 of the valve 236 so that a fluid pressure is developed in the first control port 400 for the period of time $T_1$ as indicated in FIG. 8A by the basic fluid pressure which is directed from the basic fluid pressure passageway 252 to the first control port 400 through the second and third control ports 358 and 360 of the second gearshift control valve 234 and the orifice 412. The fluid pressure developed in the first control port 400 of the valve 236 acts on the end face of the first land 416 of the valve spool 414, which is accordingly moved from the first position into the second position thereof against the force of the compression spring 424, thereby blocking the communication between the second control port 402 by the first land 416 of the valve spool 414 and providing communication between the third and second control ports 404 and 402 through the circumferential groove 420 in the valve spool 414 as shown. The basic fluid pressure which has been directed from the basic fluid pressure passageway 252 to the passageway 370 through the second and third control ports 358 and 360 of the second gearshift control valve 234 is now passed through the third and second control ports 404 and 402 of the third gearshift control valve 236 and further through the passageway 524 and the self-adjustable orifice 526 into the first fluid chamber 520 of the second control cylinder 242. A fluid pressure is thus developed in the first fluid chamber 520 of the control cylinder 242 and drives the first piston 512 to move together with the second piston 514 from the second axial position into the first axial position thereof closest to the end wall 508 of the second axial section 504 of the cylinder casing 500 as shown, causing the gearshift control lever 110 to turn from the second angular position into the first angular position about the center axis of the shaft 534. The period of time $T_1$ for which the exciting coil of the third gearshift control valve 236 is selected so that the pistons 512 and 514 are permitted to reach the positions holding the gearshift control lever 110 in the first angular position in the particular period of time $T_1$. When the exciting coil of the third gearshift control valve 236 is de-energized at the end of the time $T_1$, the valve spool 452 of the fourth gearshift control valve 238 is maintained in the first position providing communication between the second control port 442 and the first drain port 446 of the valve 238 as shown with the exciting coil of the valve 238 kept de-energized with the result that the pistons 512 and 514 are not subjected to a force urging the pistons away from the end wall 508 of the second axial section 504 of the cylinder casing 500 in the absence of fluid pressure in the first fluid chamber 520 which is in communication with the drain port 446 of the fourth gearshift control valve 238 through the passageway 528. The first piston 512 of the control cylinder 242 is thus held in the first axial position thereof and accordingly the associated gearshift control lever 110 is held in the first angular position thereof upon lapse of the period of time $T_1$. The gear-position selector lever 108 being thus held in the first angular position thereof operative to produce the first or second forward-drive gear $D_1$ or $D_2$ and the gearshift control lever 110 being held in the first angular position thereof operative to produce the first or third forward-drive gear $D_1$ or $D_3$, the gear-position selector linkage 100 and the gearshift control linkage 102 shown in FIG. 3A select in combination the first forward-drive gear $D_1$ in the transmission gear assembly 22 which is accordingly shifted from the neutral gear condition N to the first-forward drive gear condition $D_1$.

If, under these conditions, the accelerator pedal 18 which has been held in the released position is depressed in an attempt to start the vehicle from halt, the idling signal Sa is delivered from the idling condition detector 152 which is responsive to the movement of the accelerator pedal 18 within a range of stroke producing in the carburetor 14 a throttle opening degree that will produce an idling condition in the engine 10. The idling signal Sa is fed through the line 154 to the clutch control circuit 204 in the control circuit arrangement 146 shown in FIG. 6. The clutch control circuit 204 is now operative to cause the first logic circuit 218 to stop delivery of the output signal from the first output terminal and to deliver an output signal from the second output terminal. As a consequence, the exciting coil 58g of the first vacuum control valve unit 58 connected by the line 128 to the first output terminal of the logic circuit 218 deenergized and, in turn, the exciting coil 60g of the second vacuum control valve unit 60 connected by the line 130 to the second output terminal of the logic circuit 218 is energized. The valve element 58e of the first vacuum control valve unit 60 is therefore moved by the force of the associated compression spring 58f back into the first axial position thereof isolating the vacuum passageway 68 from the first port 58a and providing communication between the first and third ports 58a and 58c of the valve unit 58 and at the same time the valve element 60e of the second vacuum control valve unit 60 is moved against the force of the associated compression spring 60f from the first axial position into the second axial position thereof providing communication between the first and second ports 60a and 60b of the valve unit 60. Communication being now provided between the second port 60b of the second vacuum control valve unit 60 and the first port 58a of the first vacuum control valve unit 58 through the passageway 74 between the valve units 58 and 60, atmospheric air is admitted into the control chamber 50 of the servo unit 34 for the master cylinder 32 at a rate which is indicated by the cross sectional area of the second port 60b of the valve unit 60 as previously noted. The diaphragm-operated piston 48 of the servo motor 34 is moved in the direction of arrow e (FIG. 2) and allows the clutch assembly 20 to move into the coupled condition causing the vehicle to start.

When the vehicle is thus started, the vehicle speed sensor 172 driven by the transmission mainshaft 82 (FIGS. 3B to 3D) produces the output signal Se which is in the form of a voltage Ve proportional to the vehicle speed as indicated in FIG. 4 and the throttle-valve opening-degree detector 200 provided in association with the carburetor throttle valve produces the output signal Sm which is in the form of a voltage Vm varying with the opening degree of the carburetor throttle valve as indicated in FIG. 5. The vehicle speed signal Se and the throttle-valve opening-degree signal Sm are fed to the gearshift pattern control circuit 212 of the control circuit arrangement 146 shown in FIG. 6. If the voltages Ve and Vm of the signals Se and Sm satisfy a predetermined relationship therebetween, the gearshift pattern control circuit 212 causes the third logic circuit 228 to produce an output signal from its output terminal connected by the line 148 to the exciting coil of the solenoid-operated control valve 124 for the throttle valve actuator 120. The control valve 124 is now opened up and provides communication between the throttle valve actuator 120 and the vacuum passageway 68 so that the throttle valve actuator 120 drives the associated mechanical linkage 122 to move the carburetor throttle valve into an angular position producing an idling condition in the engine 10 irrespective of the position of the accelerator pedal 18. The idling condition thus achieved is detected by the throttle-valve opening-degree detector 200, which therefore delivers the output signal Sm to the clutch control circuit 204. The clutch control circuit 204 is now actuated to cause the first logic citcuit 218 to produce an output signal at the first output terminal thereof so that the exciting coil 58g of the first vacuum control valve unit 58 shown in FIG. 2 is energized and accordingly the associated valve element 58e is moved into the second axial position thereof providing communication between the first and second ports 58a and 58b of the valve unit 58. Vacuum is developed for a second time in the control chamber 50 of the servo unit 34 so that the clutch assembly 20 is caused to uncouple. When the clutch assembly 20 is thus uncoupled, the plunger 156 connected to the diaphragm-operated piston 48 of the servo unit 34 is axially moved in the direction of the arrow d (FIG. 2) and is disengaged from both of the piston stroke detector elements 160 and 160' on the casing 44 of the servo unit 34. The clutch stroke detector elements 160 and 160' deliver the output signals Sb and Sb' representative of the uncoupled condition of the clutch assembly 20 to the control circuit 212, which therefore causes the second logic circuit 226 to produce an output signal at the fourth output terminal thereof for a predetermined period of time which is indicated by $T_2$ in FIG. 8A. As a consequence, the exciting coil of the fourth gearshift control valve 238 connected by the line 144 to the fourth output terminal of the logic circuit 226 is energized for the period of time $T_2$ and causes the associated valve spool 452 to axially move against the force of the compression spring 462 into the second position thereof, closing the drain port 446 and providing communication between the second and third control ports 442 and 444 of the valve 238 through the circumferential groove 458 in the valve spool 452. Constant communication being established between the second and third control ports 358 and 360 in the second gearshift control valve 234 and between the third and fourth control ports 404 and 406 in the third gearshift control valve 236 irrespective of the axial positions of the respective valve spools 374 and 414 of the valves 234 and 236, the third control port 444 is in communication with the basic fluid pressure passageway 252 through the passageways 450, 370 and 368 so that the basic fluid pressure is directed through the third and second control ports 444 and 442 of the fourth gearshift control valve 238 and the fluid passageway 528 and past the self-adjustable orifice 530 into the second fluid chamber 522 of the second control cylinder 242. A fluid pressure is now developed in the second fluid chamber 522 of the control cylinder for the period of time $T_2$ as indicated in FIG. 8A and causes the first piston 512 to move into the third axial position closest to the end wall 506 of the first axial section 502 of the cylinder casing 500 in the absence of fluid pressure in the first fluid chamber 520 which is in communication with the drain port 408 of the third gearshift control valve 236 in which the valve spool 414 is held in the first position providing communication between the second control port 400 and the drain port 408 with the exciting coil thereof kept de-energized. The gear-position selector lever 108 being in the first angular position thereof to produce the first or second forward-drive gear condition $D_1$ or $D_2$ and the gearshift control lever 110 being in the third angular position to produce the second or fourth forward-drive gear condition $D_2$ or $D_4$ or the reverse-drive gear condition R, the gear-position selector and gearshift control linkages 100 and 102 shown in FIG. 3A are actuated to select, in combination, the second forward-drive gear $D_2$ in the transmission gear assembly 22.

In order to make upshift from the second forward-drive gear $D_2$ to the third forward-drive gear $D_3$, the gearshift pattern control circuit 212 causes the second logic circuit 226 to produce output signals at the third and fourth output terminals thereof for predetermined periods of time $T_3$ and $T_4$, respectively. The respective exciting coils of the third and fourth gearshift control valves 236 and 238 are consequently energized and cause the associated valve spool 414 and 452 to move into the respective second positions thereof, providing communication between the third and second control ports 404 and 402 in the valve 236 and between the third and second control ports 444 and 442 in the valve 238 so that fluid pressure is developed in both of the first and second fluid chambers 520 and 522 of the second control cylinder 242. The first piston 512 of the control cylinder 242 is now urged to move toward the first axial position thereof by the fluid pressure in the first fluid chamber 520 and in the opposite direction by the fluid pressure developed in the second fluid chamber 522 and is moved into the second axial position in which the forces resulting from the fluid pressures acting on the piston 512 from the first and second fluid chambers 520 and 522 are substantially equalized. When the piston 512 thus reaches the second axial position, the gearshift control lever 110 assumes the second angular position to produce the neutral gear condition N. The gearshift pattern control circuit 212 is arranged so that the period of time $T_4$ for which the exciting coil of the fourth gearshift control valve 238 is to be energized lapses before the period of time $T_3$ for which the exciting coil of the third gearshift control valve 236 is energized is to lapse as will be seen from FIG. 8A and, for this reason, the fluid pressure in the second fluid chamber 522 of the control cylinder 242 is drained off in the presence of the fluid pressure in the first fluid chamber 520. The piston 512 is now acted upon only by the fluid pressure in the first fluid chamber 520 and is moved into the first axial position thereof, moving the gearshift control lever 110 into the first angular position to produce the first or third forward-drive gear $D_1$ or $D_3$ as shown in FIG. 7. Substantially simultaneously as the output signals are produced at the third and fourth output terminals of the second logic circuit 226 of the control circuit arrangement 146, an output signal is delivered from the first output terminal of the logic circuit 226 under the control of the preceding gearshift pattern control circuit 212 and causes the exciting coil of the first gearshift control valve 232 to be energized through the line 138 connected to the first output terminal of the logic circuit 226. The valve spool 330 of the first gearshift valve 232 is now axially moved into the second position providing communication between the second and third control ports 320 and 322 through the circumferential groove 336 in the valve spool 330. The basic fluid pressure in the passageway 252 is therefore directed through the second and third ports 320 and 322 of the valve 232 to the fluid passageway 494 leading to the second fluid chamber 490 of the first control cylinder 240. The fluid passageway 492 open to the first fluid chamber 488 of the first control cylinder 240 being also in communication with the basic fluid pressure passageway 252 through the fourth and second control ports 362 and 358 of the second gearshift control valve 234, fluid pressure is developed in both of the first and second fluid chambers 488 and 490 of the first control cylinder 240 as will be seen from FIG. 8A. The first piston 484 of the control cylinder 240 is therefore moved toward the third axial position thereof by the fluid pressure acting thereon from the second fluid chamber 490 against the force resulting from the fluid pressure acting on the piston 484 from the first fluid chamber 488 until the piston 484 reaches the second axial position in which the forces resulting from the fluid pressures acting on the piston 484 from the first and second fluid chambers 488 and 490 are equalized with each other. The first piston 484 of the control cylinder 240 being moved into the second axial position thereof, the gear-position selector lever 108 connected to the piston 484 is moved into the second angular position thereof to produce the third or fourth forward-drive gear $D_3$ $D_4$. With the gear-position selector lever 108 moved into the second angular position thereof and the gearshift control lever 110 moved into the first angular position thereof, the gear-position selector and gearshift control linkages 100 and 102 shown in FIG. 3A select in combination the third forward-drive gear ratio $D_3$ in the transmission gear assembly 22. When the third forward-drive gear $D_3$ is thus achieved, the exciting coils of the third and fourth gearshift control valves 236 and 238 are de-energized under the control of the gearshift pattern control circuit 212 and accordingly there are no fluid pressures developed in the first and second fluid chambers of the second control cylinder 242 but the exciting coil of the first gearshift control valve 232 is kept energized through the line 138 and according the fluid pressure in the second fluid chamber 490 of the first control cylinder 240 is maintained, as will be seen from FIG. 8A. The first piston 484 of the first control cylinder 240 is held in the second axial position thereof by the fluid pressures acting on the piston 484 from the first and second fluid chambers 488 and 490 of the cylinder 240 while the first piston 512 of the second control cylinder 242 is held in the first axial position thereof in the absence of fluid pressure in both of the first and second fluid chambers 520 and 522 of the cylinder 242.

Shift from the third forward-drive gear $D_3$ to the fourth or top forward-drive gear $D_4$ is achieved when the shift pattern control circuit 212 is conditioned to cause the second logic circuit 226 to produce an output signal at the fourth output terminal thereof for a predetermined period of time $T_5$ in addition to the output signal continuedly appearing at the first output terminal of the logic circuit 226. Under these conditions, the first piston 484 of the first control cylinder 240 is maintained in the second axial position thereof in the presence of the fluid pressures in both of the first and second fluid chambers 488 and 490 and as a consequence the gear-position selector lever 108 is held in the second angular position thereof to produce the third or fourth forward-drive gear $D_3$ or $D_4$. On the other hand, valve spool 452 of the fourth gearshift valve 238 is moved into the second position providing communication between the third and second control ports 444 and 442 of the valve 238 with the associated exciting coil energized through the line 144 connected to the fourth output terminal of the logic circuit 226 so that the basic fluid pressure which has been directed from the basic fluid pressure passageway 252 to the third control port 444 of the fourth gearshift control valve 238 through the second and third gearshift control valves 234 and 236 is directed through the passageway 528 into the second fluid chamber 522 of the second control cylinder 242. A fluid pressure is thus developed in the second fluid chamber 522 of the cylinder 242 for the period of time $T_5$ as indicated in FIG. 8A and drives the first piston 512 of the cylinder 242 into the third axial position thereof, thereby moving the gearshift control lever 110 into the third angular position thereof to produce the second or fourth forward-drive gear $D_2$ or $D_4$ or the reverse-drive gear R. The gear-position selector and gearshift control linkages 100 and 102 are now actuated to select in combination the fourth or top forward-drive gear $D_4$ in the transmission gear assembly 22. When the fourth forward-drive gear $D_4$ is thus achieved, there is no fluid pressure in the second fluid chamber 522 of the second control cylinder 242 with the exciting coil of the fourth gearshift valve 238 de-energized at the end of the time $T_5$ but the fluid pressure in the first fluid chamber 488 of the first control cylinder 240 is maintained with the exciting coil of the second gearshift control valve 234 kept energized.

If, thereafter, the second logic circuit 226 of the control circuit arrangement 146 shown in FIG. 6 delivers an output signal from the third output terminal thereof for a predetermined period of time $T_6$ under the control of the gearshift pattern control circuit 212, the exciting coil of the third gearshift control valve 236 is energized to provide communication between the third and second control ports 404 and 402 of the valve 236 so that the basic fluid pressure is directed through the fluid passageway 524 to the first fluid chamber 520 of the second control cylinder 242 and moves the first piston 512 of the cylinder 242 back into the first axial position thereof, causing the gearshift control lever 110 to turn into the first angular position thereof to produce the first or third forward-drive gear $D_1$ or $D_3$. With the gear-position selector lever 108 maintained in the second angular position to produce the third or fourth forward-drive gear $D_3$ or $D_4$, the transmission gear assembly 22 is shifted down from the fourth forward-drive gear $D_4$ to the third forward-drive gear $D_3$. When the third forward-drive gear $D_3$ is thus achieved in the transmission gear assembly 22, the fluid pressure in the first fluid chamber 520 of the second control cylinder 242 is disappeared with the exciting coil of the third gearshift valve 236 de-energized at the end of the time $T_6$.

To make a downshift from the third forward-drive gear $D_3$ to the second forward-drive gear $D_2$, the gearshift control circuit 212 of the control circuit arrangement 146 shown in FIG. 6 causes the second logic circuit 226 to cut off the output signal from the first output terminal and to produce output signals at the second and third output terminals for predetermined periods of time $T_7$ and $T_8$. Under these conditions, the first piston 484 of the first control cylinder 240 is moved into the first axial position by the fluid pressure in the first fluid chamber 488 in the absence of a fluid pressure in the second fluid chamber 490 of the cylinder 240 and moves the gear-position selector lever 108 into the first angular position thereof to produce the first or second forward-drive gear $D_1$ or $D_2$. On the other hand, the first piston 512 of the second control cylinder 242 is moved from the first axial position into the second axial position by the fluid pressures acting on the piston 512 from both of the first and second fluid chambers 520 and 522 of the control cylinder 242 and moves the gearshift control lever 110 into the second angular position thereof to produce the neutral gear N. The output signal from the third output terminal of the logic circuit 226 lapses before the output signal from the fourth output terminal of the logic circuit 226 under the control of the gearshift pattern control circuit 212 so that the fluid pressure in the first fluid chamber 520 of the second control cylinder 242 is drained off through the fluid passageway 524 and the drain port 408 of the third gearshift control valve 236 while the fluid pressure remains in the second fluid chamber 522 of the control cylinder 242 as will be seen from FIG. 8A with the result that the first piston 512 of the cylinder 242 is moved from the second axial position to the third axial position thereof, moving the gearshift control lever 110 into the third angular position thereof to produce the second or fourth forward-drive gear $D_2$ or $D_4$ or the reverse-drive gear R. The transmission gear assembly 22 is therefore actuated to make a downshift from the third forward-drive gear $D_3$ to the second forward-drive gear $D_2$.

When the logic circuit 226 of the circuit arrangement 146 shown in FIG. 6 is thereafter caused by the gearshift control circuit 212 to produce an output signal at the third output terminal thereof for a predetermined period of time $T_9$, the valve spool 414 of the third gearshift control valve 236 is moved into the second position thereof providing communication between the third and second control ports 404 and 402 of the valve 236 so that a fluid pressure is developed in the first fluid chamber 520 of the second control cylinder 242 for the period of time $T_9$ as will be seen from FIG. 8A. The first piston 512 of the control cylinder 242 is now moved from the third axial position into the first axial position thereof and accordingly the gearshift control lever 110 is moved from the third angular position into the firs angular position thereof to produce the first or third forward-drive gear $D_1$ or $D_2$. The gear-position selector lever 108 being maintained in the first angular position to produce the first or forward-drive gear $D_1$ or $D_2$, shift is made in the transmission gear assembly 22 from the second forward-drive gear $D_2$ down to the first forward-drive gear $D_1$. If, under these conditions, the exciting coils of the third and fourth gearshift control valves 236 and 238 are energized for predetermined period of time $T_{10}$ and $T_{11}$, respectively, by the output signal which are delivered from the third and fourth output terminals of the logic circuit 226 under the control of the gearshift pattern control circuit 212, the first piston 512 of the second control cylinder 242 is moved into the second axial position thereof by the fluid pressures acting on the piston 512 from both of the first and second fluid chambers 520 and 522 of the control cylinder 242 so that the gearshift control lever 110 is moved into the second angular position thereof to produce the neutral gear N. The transmission gear assembly 22 now resumes the initial neutral gear condition N and interrupts the delivery of the driving torque from the transmission input shaft to the transmission mainshaft 82.

Figure 9:
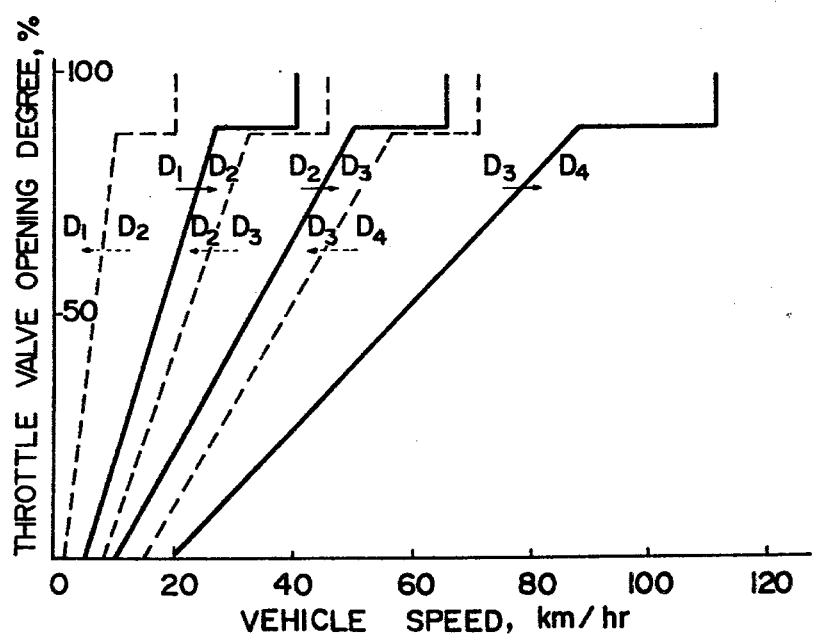
FIG. 9 is a graph showing gearshift patterns which are obtained in the power transmission embodying the present invention in accordance with vehicle speed and throttle valve opening degree.

FIG. 9 diagrammatically illustrates shift patterns in which upshifts and downshifts are thus made between the first and second, second the third, and third and fourth forward-drive gears in the transmission gear assembly 22 in relation to the vehicle speed and the opening degree of the throttle valve of the carburetor of the engine 10 by means of the control circuit 146 shown in FIG. 6 and the hydraulic control system 116 shown in FIG. 7.

To make a downshift to the second forward-drive gear $D_2$ directly from the fourth forward-drive gear $D_4$ which has been established with fluid pressures developed in both of the first and second fluid chambers 488 and 490 of the first control cylinder 240 and concurrently with the first piston 512 of the second control cylinder 242 held in the third angular position, the exciting coil of the first gearshift control valve 232 is deenergized to cause the fluid pressure in the second fluid chamber 490 of the first control cylinder 240 to be drained off through the drain port 324 of the first gearshift control valve 232 and concurrently the respective exciting coils of the third and fourth gearshift control valves 236 and 238 are energized for predetermined periods of time so that fluid pressures are developed in both of the first and second fluid chambers 520 and 522 of the second control cylinder 242. The gear-position selector lever 108 is therefore moved from the second angular position into the first angular position to produce the first or second forward-drive gear $D_1$ or $D_2$ and at the same time the gearshift control lever 110 is moved from the third angular position once into the second angular position by the fluid pressures acting on the first piston 512 of the second control cylinder 242 from both of the first and second fluid chambers 520 and 522 of the control cylinder 242. The exciting coil of the third gearshift control valve 236 being de-energized while the exciting coil of the fourth gearshift control valve 238 still remain energized, the fluid pressure in the first fluid chamber 520 of the second control cylinder 242 is drained off while the fluid pressure still remains in the second fluid chamber 522 so that the first piston 512 of the control cylinder 242 is moved back from the second axial position into the third axial position thereof, moving the gearshift control lever 110 back into the third angular position to produce the second or fourth forward-drive or reverse-drive gear $D_2$, $D_3$ or R. The gear-position selector lever 108 and the gearshift control lever 110 being thus moved into the respective first and third angular positions, the transmission gear assembly 22 is actuated to select the second forward gear $D_2$, as will be seen from the diagram (a) of FIG. 8B.

Figure 8B:
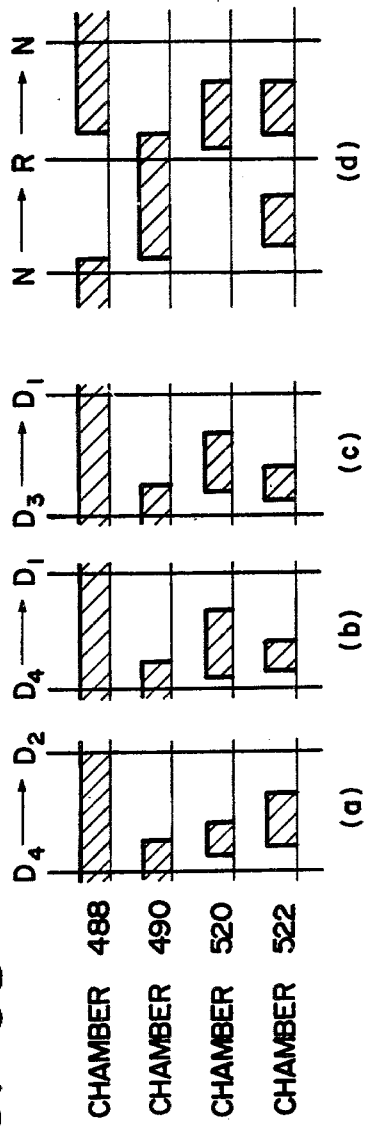
FIG. 8B is a diagram similar to FIG. 8A but shows the schedules in accordance with which shifts are to be made directly from the fourth to second forward-drive gear in diagram (a), from the fourth to first forward-drive gear in diagram (b), from the third to first forward-drive gear in diagram (c) and from the neutral to reverse-drive gear and backwardly from the reverse-drive to neutral gear in diagram (d)

In order to make a downshift from the fourth forward-drive gear $D_4$ directly to the first forward-drive gear $D_1$, the exciting coil of the first gearshift valve 232 is de-energized and simultaneously the respective exciting coils of the third and fourth gearshift control valves 236 and 238 are energized for predetermined periods of time, the energization of the exciting coil of the fourth gearshift control valve 238 being terminated prior to the termination of the energization of the exciting coil of the third gearshift valve 236 as will be seen from the diagram (b) of FIG. 8B. The gear-position selector lever 108 is thus moved from the second angular position to the first angular position to produce the first or second forward-drive gear $D_1$ or $D_2$ and at the same time the gearshift control lever 110 is temporarily moved from the third angular position to the second angular position to produce the neutral gear N. Upon termination of the energization of the third gearshift control valve 236, the fluid pressure in the first fluid chamber 520 of the second control cylinder 242 is drained off so that the gearshift control lever 110 is further moved from the second angular position to the first angular position thereof. The gear-position selector lever 108 being in the first angular position to produce the first or second forward-drive gear $D_1$ or $D_2$ and the gearshift control lever 110 being thus moved into the first angular position to produce the first or third forward-drive gear $D_1$ or $D_3$, the transmission gear assembly 22 is actuated to make a downshift from the fourth forward-drive gear $D_4$ directly into the first forward-drive gear $D_1$.

To make a downshift to the first forward-drive gear $D_1$ directly from the third forward-drive gear $D_3$ which has been established with the fluid pressures developed in both of the first and second fluid chambers 488 and 490 of the first control cylinder 240 and with the first piston 512 of the second control cylinder 242 held in the first axial position in the absence of fluid pressure in both of the first and second fluid chambers 520 and 522 of the control cylinder 242, the exciting coil of the first gearshift control valve 232 is de-energized and the respective exciting coils of the third and fourth gearshift control valves 236 and 238 are energized for predetermined periods of time wherein the period of time for which the exciting coil of the fourth gearshift control valve 238 is to be energized terminates before the period of time for which the exciting coil of the third gearshift control valve 236 is to be energized terminates, as will be seen from the diagram (c) of FIG. 8B. The gear-position selector lever 108 is therefore moved from the second angular position into the first angular position thereof by the fluid pressure developed in the first fluid chamber 488 of the first control cylinder 240 in the absence of the fluid pressure in the second fluid chamber 490 of the cylinder 240 while the gearshift control lever 110 is once moved from the first angular position to the second angular position thereof by the pressures acting on the first piston 512 of the second control cylinder 242 from both of the first and second fluid chambers 520 and 522 of the cylinder 242. Upon termination of the energization of the exciting coil of the fourth gearshift control valve 238, the gearshift control lever 110 is moved back from the second angular position into the first angular position thereof by the fluid pressure remaining in the first fluid chamber 520 in the absence of the fluid pressure in the second fluid chamber 522 of the control cylinder 242. The gear-position selector lever 108 being moved into the first angular position to produce the first or second forward-drive gear $D_1$ or $D_2$ and furthermore the gearshift control lever 110 being thus moved back into the first angular position to produce the first or third forward-drive gear $D_1$ or $D_3$, the transmission gear assembly 22 is actuated to make a downshift from the the third forward-drive gear $D_3$ directly to the first forward-drive gear $D_1$.

When the transmission gearshift lever 118 is manually moved from the neutral position N to the reverse-drive position R, the gearshift pattern control circuit 212 of the circuit arrangement 146 shown in FIG. 6 causes the logic circuit 226 to produce output signals at the first, second and fourth output terminals thereof in response to the gearshift-lever position signal Sf representative of the reverse-drive position R selected by the transmission gearshift lever 118. When this occurs, the exciting coil of the second gearshift control valve 234 is energized to block the communication between the second and fourth control ports 358 and 326 of the control valve 234 and accordingly between the fluid passageways 368 and 492 while the exciting coil of the first gearshift control valve 232 is energized to provide communication between the second and third control ports 320 and 322 of the control valve 232 and accordingly between the fluid passageways 252 and 494. The first piston 484 of the first control cylinder 240 is therefore moved into the third axial position thereof by the fluid pressure developed in the second fluid chamber 490 as shown in the left-hand half of the diagram (d) of FIG. 8B in the absence of the fluid pressure in the first fluid chamber 488 of the control cylinder 240 and thus moves the gear-position selector lever 108 from the first angular position to the third angular position to produce the reverse-drive gear R. With the exciting coil of the fourth gearshift control valve 238 energized, furthermore, communication is provided between the third and second control ports 444 and 442 of the control valve 238 and accordingly between the fluid passageways 450 and 528 through the valve 238, causing the gearshift control lever 110 to move from the second angular position into the third angular position thereof by the fluid pressure acting on the first piston 512 of the first control cylinder 242 from the second fuid chamber 522 in the absence of the fluid pressure in the first fluid chamber 520 of the cylinder 242. The gear-position selector lever 108 being thus moved into the third angular position operative to produce the reverse-drive gear R and at the same time the gearshift control lever 110 being moved into the third angular position thereof to produce the second or fourth forward-drive gear $D_2$ or $D_4$ or the reverse-drive gear R, the transmission gear assembly 22 is conditioned to shift the neutral gear N to the reverse-drive gear R. To make a shift from the reverse-drive gear R back to the neutral gear N, the respective exciting coils of the first and second gearshift control valves 232 and 234 are de-energized and the respective exciting coils of the third and fourth gearshift control valves 236 and 238 are energized for predetermined periods of time. With the exciting coils of the first and second gearshift control valves 232 and 234 thus de-energized, a fluid pressure is developed in the first fluid chamber 488 of the first control cylinder 240 and at the same time the fluid pressure which has been developed in the second fluid chamber 490 of the control cylinder 240 is drained off through the fluid passageway 494 and the drain port 324 of the first gearshift control valve 232, as will be seen from the right-hand half of the diagram (d) of FIG. 8B. The exciting coils of the third and fourth gearshift control valves 236 and 238 being energized, furthermore, fluid pressures are developed in both of the first and second fluid chambers 520 and 522 of the second control cylinder 242 for the above-mentioned predetermined periods of time as shown in the diagram (d) of FIG. 8B. The gear-position selector lever 108 is consequently moved from the third angular position of the first angular position by the fluid pressure acting on the first piston 484 of the first control cylinder 240 from the first fluid chamber 488 of the control cylinder 240, while the gearshift control lever 110 is moved from the third angular position to the second angular position thereof by the fluid pressures acting on the first piston 512 from both of the first and second fluid chambers 520 and 522 of the control cylinder 242. The gear-position selector lever 108 being thus moved into the first angular position thereof to produce the first or second forward-drive gear $D_1$ or $D_2$ and the gearshift control lever 110 being moved into the second angular position thereof operative to produce the neutral gear N, the transmission gear assembly 22 is actuated to make a shift from the reverse-drive gear R to the neutral gear N.

The self-adjustable orifices 526 and 530 provided in the fluid passageways 524 and 528 communicating with the first and second fluid chambers 520 and 522, respectively, of the second control cylinder 242 are adapted to restrict the flow rates of the fluid when the fluid is being discharged from the fluid chambers 520 and 522 through the drain ports 408 and 446 of the third and fourth gearshift control valves 236 and 238, respectively. This is conducive to protection of the synchronizers in the transmission gear assembly 22 when shift is being made between the forward-drive gears.

From the foregoing description it will have been appreciated that one outstanding feature of the countershaft-type automatic power transmission embodying the present invention is that the operation of the clutch assembly 20 to couple and uncouple is controlled by means of a vacuum-operated servo unit 34 which is responsive to various operational variables of a vehicle such as the opening degree of the carburetor throttle valve, the output speed of the engine, the vehicle speed, the gear positions selected, the temperature of the engine flywheel, the temperature of the engine cooling water, the condition of the brake pedal, the inclination of the road surface on which the vehicle is running, and the condition of the air conditioner equipped in the vehicle. These operational variables are introduced into and processed by the control circuit 146 for actuating the vacuum control valve units 58, 60, 62 and 64 in such a manner that the servo unit 34 is capable of driving the clutch assembly 22 toward the fully coupled condition at rates which are varied depending upon the air inlet ports of the valve units 58, 60, 62 and 64 through which air is admitted to the control chamber 50 of the servo unit 34 for the master cylinder 32 for operating the clutch assembly 20. When the vehicle is being started from halt, the clutch assembly 20 is maintained in a partially coupled condition which is varied with the opening degree of the carburetor throttle valve. The controlled partially coupled condition of the clutch assembly 22 is also put into play when the vehicle speed reaches a predetermined level. The clutch pressure is regulated depending upon the temperature of the engine flywheel so that the vehicle can be started smoothly even when the temperature of the engine cooling water is still at a low level. A fundamental version of the clutch control arrangement to achieve these functions is disclosed in the applicants' copending U.S. patent application Ser. No. 685,167 (which corresponds to British Patent Application No. 19285/76 and West German Patent Application No. P 26 20 960.9) or the applicant's copending U.S. patent application Ser. No. 694,950, now U.S. Pat. No. 4,086,992 (which corresponds to British Patent Application No. 24489/76 and West German Patent Application No. P 26 26 352.5).

Another outstanding feature of the countershaft-type automatic power transmission embodying the present invention is that the shifts between the neutral, forward-drive and reverse-drive gears are also effected automatically in accordance with various operational variables of the vehicle. The gearshift pattern thus achieved between these gears is variable depending upon the areas (such as congested or suburban areas) in which the vehicle is to run and/or the natures of the road surfaces (of, for example, sloping roads or highways). Arrangements are further made so that the engine is enabled to operate even when the vehicle is brought to a halt with the transmission gear assembly 20 in the neutral gear condition. When the neutral gear is in play in the transmission gear assembly when the vehicle is brought to a halt, the clutch assembly 20 is coupled. This is conducive to alleviation of the burdens to be imposed on the clutch release bearing.

A third outstanding feature of the power transmission embodying the present invention is the provision of means arranged to close the carburetor throttle valve independently of the accelerator pedal. Such means is also automatically controlled in accordance with some operational variable of the vehicle such as the vehicle speed and the opening degree of the carburetor throttle valve and is actuated to close the carburetor throttle valve when the clutch assembly is actuated into an uncoupled condition and shift is to be made from one forward-drive gear to another. When the desired forward-drive gear such as the second forward-drive gear from the first forward-drive gear is achieved, the carburetor throttle valve is released from the particular means and is operated by the accelerator pedal as usual.

What is claimed is:

1. In an automatic countershaft power transmission for an automotive vehicle comprising an internal combustion engine including a mixture supply system having a throttle valve to be operated by an accelerator pedal of the vehicle; a countershaft transmission gear assembly including a transmission input shaft, a transmission mainshaft substantially in line with the input shaft, a transmission counershaft substantially parallel with the mainshaft and a plurality of gears on the transmission input shaft, mainshaft and countershaft and arranged to be capable of producing a neutral gear condition, a plurality of forward-drive gear conditions and at least one reverse-drive gear condition; a clutch assembly disposed between the output shaft of the engine and said transmission input shaft and having a fully coupled condition between the engine output shaft and the transmission input shaft and an uncoupled condition disconnecting the transmission input shaft from the engine output shaft; electrically operated hydraulic control system operatively connected to said transmission gear assembly; gearshift control means operative to actuate said hydraulic control system for selectively producing said neutral, forward-drive and reverse-drive gear conditions depending upon predetermined operational parameters of the vehicle; electrically operated throttle-valve actuating means operative to actuate said throttle valve into an idling position independently of the accelerator pedal of the vehicle; and electric throttle valve control means operative to actuate said throttle-valve actuating means to move the throttle valve into an idling position independently of the accelerator pedal, the improvement comprising fluid-operated clutch actuating means operatively connected to said clutch assembly and having a variable volume control chamber for producing the coupled and uncoupled condition in the clutch assembly when the control chamber is expanded and contracted, respectively, electrically operated clutch control valve means connected to said clutch actuating means, and electric valve control means responsive to preselected operational parameters of the vehicle for controlling the clutch control valve means to continuously vary the volume of said control chamber depending upon said preselected operational parameters, said valve control means, said gearshift control means and said throttle-valve control means being cooperative with each other for actuating said clutch control valve means to contract said control chamber in response to a shift being made between any of said gear conditions, moving said throttle valve into the idling position thereof independently of the accelerator pedal when said clutch control valve means is in a condition establishing the uncoupled condition in said clutch assembly, and producing an upshift between said forward-drive gear conditions when said throttle-valve control means is in a condition having said throttle-valve actuating means actuated and said valve control means is in a condition having the clutch control valve means actuated to produce the uncoupled condition in the clutch assembly under conditions in which the vehicle speed is higher than a predetermined level, said clutch control valve means including a vacuum port communicating with a source of vacuum and communicable with said control chamber for causing the control chamber to contract when communication is provided between the control chamber and said vacuum source through said vacuum port, and a plurality of air ports each communicating with the atmosphere and communicable with said control chamber, the individual air ports having different cross sectional areas and being arranged in series with said control chamber, said valve control means being operative to have said air ports selectively and successively brought into communication with said control chamber for allowing atmospheric air into the control chamber at stepwise variable rates and thereby causing the control chamber to expand at stepwise variable rates so that said clutch assembly is operated from the uncoupled condition to the fully coupled condition at stepwise variable rates.

2. The improvement as set forth in claim 1, further comprising modifier valve means arranged in paralle with said clutch control valve means between said control chamber and the atmosphere and electrically connected to said valve control means for forming an orifice between the control chamber and the atmosphere and thereby allowing atmospheric air into the control chamber when said communication is established between the control chamber and said vacuum source through said vacuum port.

3. The improvement as set forth in claim 1, in which said clutch control valve means comprises first, second, third and fourth valve means electrically connected in parallel with said valve control means and each having first, second and third ports, each of said valve units being operative between a first condition providing communication between the first and third ports thereof and a second condition providing communication between the first and second ports thereof, the first port of the first valve unit being in constant communication with said control chamber, the second port of said first valve unit constituting said vacuum port, the respective first ports of the second, third and fourth valve units being in constant communication with the respective third ports of the first, second and third valve units, respectively, the respective second ports of the second, third and fourth valve units and the third port of the fourt valve unit constituting said air ports, said valve control means being operative to actuate the first to fourth valve units into the respective second conditions thereof sequentially when said clutch assembly is to be operated from the uncoupled condition to the fully coupled condition thereof.

* * * * *